(12) United States Patent
Wang

(10) Patent No.: US 12,396,610 B2
(45) Date of Patent: Aug. 26, 2025

(54) METHOD AND APPARATUS FOR EXPLORING SUBSTANCE CONTOUR ON GROUND, AND CLEANING DEVICE

(71) Applicants: YUNJING INTELLIGENCE (SHENZHEN) CO., LTD., Guangdong (CN); YUNJING INTELLIGENCE INNOVATION (SHENZHEN) CO., LTD., Guangdong (CN)

(72) Inventor: Jintao Wang, Guangdong (CN)

(73) Assignees: YUNJING INTELLIGENCE (SHENZHEN) CO., LTD., Shenzhen (CN); YUNJING INTELLIGENCE INNOVATION (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 19/093,263

(22) Filed: Mar. 28, 2025

(65) Prior Publication Data
US 2025/0221598 A1     Jul. 10, 2025

Related U.S. Application Data

(63) Continuation of application No. PCT/CN2023/122857, filed on Sep. 28, 2023.

(30) Foreign Application Priority Data

Sep. 28, 2022 (CN) .......................... 202211193838.8

(51) Int. Cl.
*A47L 11/40* (2006.01)
*G05D 1/246* (2024.01)
(Continued)

(52) U.S. Cl.
CPC ....... *A47L 11/4011* (2013.01); *A47L 11/4002* (2013.01); *A47L 11/4061* (2013.01);
(Continued)

(58) Field of Classification Search
CPC .............. A47L 11/4011; A47L 11/4002; A47L 11/4061; A47L 2201/04; G05D 1/246;
(Continued)

(56) References Cited

U.S. PATENT DOCUMENTS 7,069,124 B1 * 6/2006 Whittaker ............ G05D 1/0274
701/28
8,346,389 B2 * 1/2013 Kim ...................... A47L 9/2852
318/568.12
(Continued)

FOREIGN PATENT DOCUMENTS

CN      102551591 A     7/2012
CN      102949144 A     3/2013
(Continued)

OTHER PUBLICATIONS

Notification to Grant Patent Right for Invention, Chinese Application No. 202211193838.8, mailed Jun. 29, 2023 (3 pages).

*Primary Examiner* — Bhavesh V Amin

(57) ABSTRACT

A method and apparatus for exploring a substance contour on ground, and a cleaning device are provided. The method includes: triggering, in response to a cleaning device detecting a preset substance on ground, the cleaning device to alternately switch between an inner boundary exploration mode and an outer boundary exploration mode; controlling, in the inner boundary exploration mode and the outer boundary exploration mode, the cleaning device to detect a substance boundary point in a predetermined direction, to obtain a substance boundary point collection; and determining a contour of the preset substance based on the substance boundary point collection. By using the technical solution provided by the present disclosure, the efficiency of the cleaning device exploring the contour of the substance can be improved.

20 Claims, 8 Drawing Sheets

(51) Int. Cl.
  *G05D 1/622* (2024.01)
  *G05D 1/648* (2024.01)
  *G05D 105/10* (2024.01)

(52) U.S. Cl.
  CPC ............ *G05D 1/246* (2024.01); *G05D 1/622* (2024.01); *G05D 1/6484* (2024.01); *A47L 2201/04* (2013.01); *G05D 2105/10* (2024.01)

(58) Field of Classification Search
  CPC ... G05D 1/622; G05D 1/6484; G05D 2105/10
  See application file for complete search history.

(56) References Cited

U.S. PATENT DOCUMENTS

| | | | | |
|---|---|---|---|---|
| 10,012,996 | B1* | 7/2018 | Canoso | G05D 1/0231 |
| 10,796,562 | B1* | 10/2020 | Wild | G08B 19/00 |
| 11,037,320 | B1* | 6/2021 | Ebrahimi Afrouzi | G01C 3/085 |
| 11,202,543 | B2* | 12/2021 | Pohlman | A47L 11/4011 |
| 11,269,349 | B2* | 3/2022 | Shao | G05D 1/0219 |
| 11,274,929 | B1* | 3/2022 | Afrouzi | G06T 7/30 |
| 11,435,192 | B1* | 9/2022 | Ebrahimi Afrouzi | G01S 17/89 |
| 11,656,082 | B1* | 5/2023 | Ebrahimi Afrouzi | G05D 1/0272 700/259 |
| 12,168,457 | B2* | 12/2024 | Kim | G06F 16/285 |
| 12,282,332 | B2* | 4/2025 | Shao | G05D 1/0219 |
| 2002/0116089 | A1* | 8/2002 | Kirkpatrick, Jr. | G05D 1/0227 700/245 |
| 2003/0030398 | A1* | 2/2003 | Jacobs | G05D 1/0274 318/568.12 |
| 2004/0168148 | A1* | 8/2004 | Goncalves | G05D 1/0231 717/104 |
| 2004/0236468 | A1* | 11/2004 | Taylor | A47L 9/2894 318/568.12 |
| 2005/0131581 | A1* | 6/2005 | Sabe | G05D 1/0251 700/245 |
| 2005/0171638 | A1* | 8/2005 | Uehigashi | G05D 1/0238 701/23 |
| 2005/0171644 | A1* | 8/2005 | Tani | G05D 1/0259 701/25 |
| 2005/0182518 | A1* | 8/2005 | Karlsson | G06V 10/84 700/253 |
| 2005/0273967 | A1* | 12/2005 | Taylor | G05D 1/0227 15/319 |
| 2006/0021168 | A1* | 2/2006 | Nishikawa | A47L 9/009 15/49.1 |
| 2006/0190135 | A1* | 8/2006 | Lee | G05D 1/0238 701/23 |
| 2007/0027579 | A1* | 2/2007 | Suzuki | G05D 1/0251 700/245 |
| 2007/0271004 | A1* | 11/2007 | Kim | A47L 9/2852 318/568.12 |
| 2010/0094460 | A1* | 4/2010 | Choi | G05D 1/0274 700/251 |
| 2011/0167574 | A1* | 7/2011 | Stout | B25J 9/163 701/25 |
| 2011/0178709 | A1* | 7/2011 | Park | G09B 29/00 901/1 |
| 2013/0000675 | A1* | 1/2013 | Hong | G05D 1/0246 15/49.1 |
| 2014/0207282 | A1* | 7/2014 | Angle | B25J 13/006 901/1 |
| 2014/0350839 | A1* | 11/2014 | Pack | G05D 1/0231 901/1 |
| 2015/0362921 | A1* | 12/2015 | Hanaoka | G05D 1/0274 702/159 |
| 2016/0271795 | A1* | 9/2016 | Vicenti | G05D 1/622 |
| 2017/0205822 | A1* | 7/2017 | Shin | G05D 1/0214 |
| 2017/0315554 | A1* | 11/2017 | Lee | G05D 1/0219 |
| 2017/0325647 | A1* | 11/2017 | Kwak | A47L 9/2857 |
| 2018/0039275 | A1* | 2/2018 | Yun | A47L 9/009 |
| 2018/0210448 | A1* | 7/2018 | Lee | G05D 1/0214 |
| 2018/0344115 | A1* | 12/2018 | Shin | A47L 9/2852 |
| 2019/0011928 | A1* | 1/2019 | Ouyang | G05D 1/0212 |
| 2019/0011929 | A1* | 1/2019 | Maeno | G05D 1/0274 |
| 2019/0035100 | A1* | 1/2019 | Ebrahimi Afrouzi | G06N 3/045 |
| 2019/0061156 | A1* | 2/2019 | Li | G05D 1/027 |
| 2019/0094870 | A1* | 3/2019 | Afrouzi | G05D 1/0274 |
| 2019/0196497 | A1* | 6/2019 | Eoh | G05D 1/0274 |
| 2019/0265725 | A1* | 8/2019 | Shao | G05D 1/0278 |
| 2019/0320867 | A1* | 10/2019 | Noh | B25J 9/16 |
| 2020/0018606 | A1* | 1/2020 | Wolcott | G01C 21/3819 |
| 2020/0125113 | A1* | 4/2020 | Eoh | G06F 18/2413 |
| 2020/0150655 | A1* | 5/2020 | Artes | G05D 1/0016 |
| 2020/0306983 | A1* | 10/2020 | Noh | G01S 7/4802 |
| 2020/0326722 | A1* | 10/2020 | Lim | B25J 9/0003 |
| 2020/0359867 | A1* | 11/2020 | Shen | A47L 11/4011 |
| 2020/0409382 | A1* | 12/2020 | Herman | A47L 9/2889 |
| 2021/0018929 | A1* | 1/2021 | Choi | G05D 1/0246 |
| 2021/0089040 | A1* | 3/2021 | Ebrahimi Afrouzi | G05D 1/0248 |
| 2021/0131822 | A1* | 5/2021 | Artes | G05D 1/0225 |
| 2021/0278861 | A1* | 9/2021 | Ben-David | G05D 1/0255 |
| 2022/0300008 | A1* | 9/2022 | Shao | G05D 1/0278 |
| 2022/0390954 | A1* | 12/2022 | Klingensmith | G06F 18/21355 |
| 2023/0176557 | A1* | 6/2023 | Cella | G05B 13/048 700/117 |
| 2024/0142994 | A1* | 5/2024 | Ebrahimi Afrouzi | A47L 11/4091 |
| 2024/0324838 | A1* | 10/2024 | Ebrahimi Afrouzi | G05D 1/2446 |

FOREIGN PATENT DOCUMENTS

| | | |
|---|---|---|
| CN | 109984688 A | 7/2019 |
| CN | 111708360 A | 9/2020 |
| CN | 113208511 A | 8/2021 |
| CN | 113693493 A | 11/2021 |
| CN | 113693494 A | 11/2021 |
| CN | 113693521 A | 11/2021 |
| CN | 113974507 A | 1/2022 |
| CN | 114869175 A | 8/2022 |
| CN | 115500737 A | 12/2022 |
| EP | 3985469 A1 | 4/2022 |
| EP | 4043988 A1 | 8/2022 |

* cited by examiner

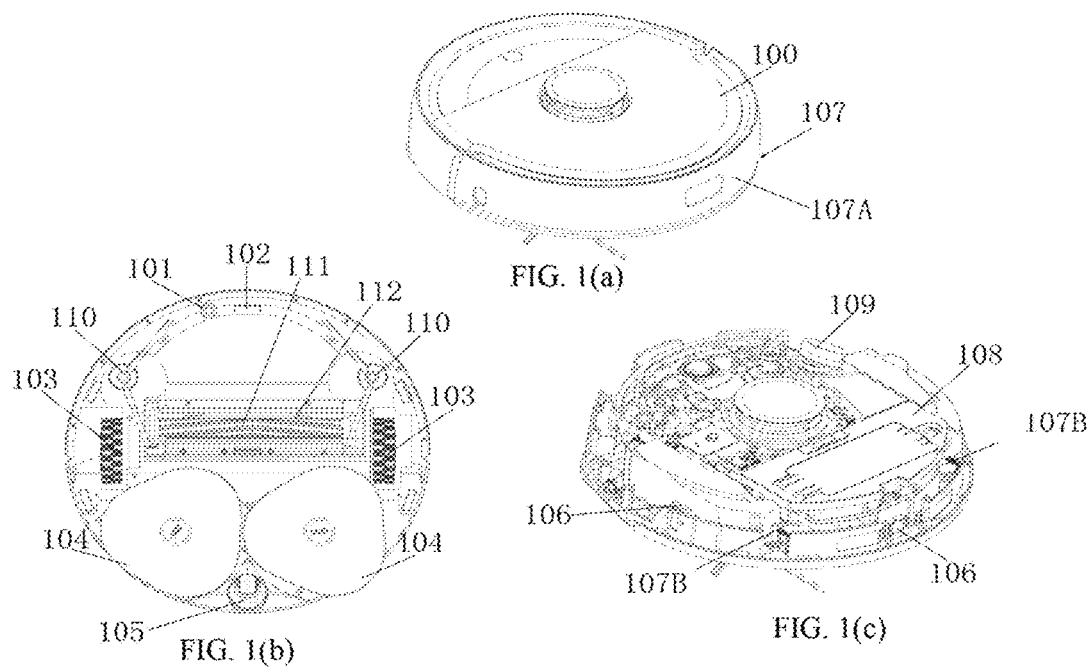

FIG. 1(a)
FIG. 1(b)
FIG. 1(c)

210 — Trigger, in response to a cleaning device detecting a preset substance on ground, the cleaning device to alternately switch between an inner boundary exploration mode and an outer boundary exploration mode 220 — Control, in the inner boundary exploration mode and the outer boundary exploration mode, the cleaning device to detect a substance boundary point in a predetermined direction, to obtain a substance boundary point collection 230 — Determine a contour of the preset substance based on the substance boundary point collection

FIG. 2

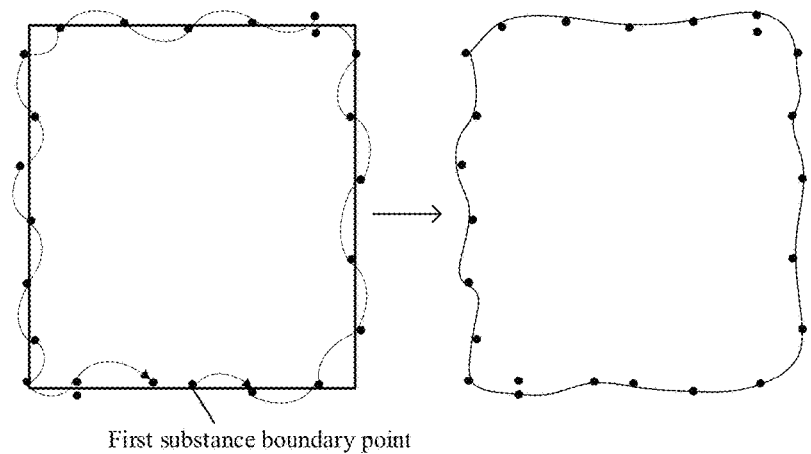
First substance boundary point
FIG. 12
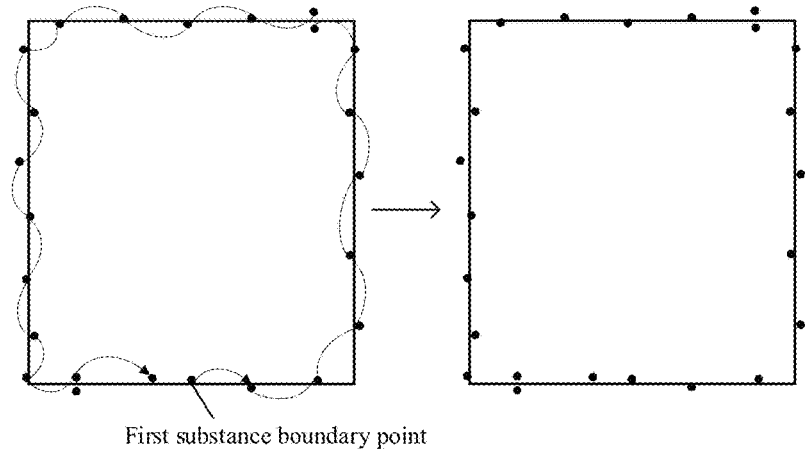
First substance boundary point
FIG. 13
1101
Determine, if an exploration of the preset substance by the cleaning device is interrupted, an explored contour of the preset substance based on a detected substance boundary point collection
1102
Explore an unexplored preset substance based on the explored contour of the preset substance
FIG. 14

METHOD AND APPARATUS FOR EXPLORING SUBSTANCE CONTOUR ON GROUND, AND CLEANING DEVICE

TECHNICAL FIELD

The present disclosure relates to the technical field of cleaning device controlling, in particular to a method and apparatus for exploring a substance contour on ground, and a cleaning device.

BACKGROUND

Currently, for cleaning devices including sweeping robots, in a process of exploring substances on ground, such as exploring a carpet on ground, it is commonly necessary to explore the contour of the carpet. For example, in the process of exploring the contour of the carpet, the sweeping robot of related art generally explores on the outside of the contour of the carpet, which needs the sweeping robot to rotate in place to adjust an exploration direction, leading to a decreased efficiency of exploring the contour of the substance on ground. Therefore, how to improve the efficiency of the cleaning device exploring the contour of the substance is a technical problem to be solved.

SUMMARY

Embodiments of the present disclosure provide a method and apparatus for exploring a substance contour on ground, and a cleaning device, to improve the efficiency of the cleaning device exploring the substance contour on ground.

Other features and advantages of the present disclosure will become apparent through the detailed description below, or will be partially learned through the practice of the present disclosure.

According to a first aspect, an embodiment of the present disclosure provides a method for exploring a substance contour on ground. The method includes: triggering, in response to a cleaning device detecting a preset substance, the cleaning device to alternately switch between an inner boundary exploration mode and an outer boundary exploration mode; controlling, in the inner boundary exploration mode and the outer boundary exploration mode, the cleaning device to detect a substance boundary point in a predetermined direction, to obtain a substance boundary point collection; and determining a contour of the preset substance based on the substance boundary point collection.

In some embodiments, based on the foregoing solution, the triggering the cleaning device to alternately switch between the inner boundary exploration mode and the outer boundary exploration mode includes: triggering the cleaning device to switch to the outer boundary exploration mode if at least one substance boundary point is detected in the inner boundary exploration mode; and triggering the cleaning device to switch to the inner boundary exploration mode if at least one substance boundary point is detected in the outer boundary exploration mode.

In some embodiments, based on the foregoing solution, the triggering the cleaning device to alternately switch between the inner boundary exploration mode and the outer boundary exploration mode includes: controlling, if an obstacle is detected by the cleaning device in the inner boundary exploration mode, the cleaning device to perform a first scheduled action until the substance boundary point is detected, and triggering the cleaning device to switch to the outer boundary exploration mode; and controlling, if an obstacle is detected by the cleaning device in the outer boundary exploration mode, the cleaning device to perform a second scheduled action until the substance boundary point is detected, and triggering the cleaning device to switch to the inner boundary exploration mode.

In some embodiments, based on the foregoing solution, the controlling the cleaning device to perform the first scheduled action until the substance boundary point is detected, and triggering the cleaning device to switch to the outer boundary exploration mode includes: controlling the cleaning device to rotate in place in a first predetermined direction until the substance boundary point is detected, and triggering the cleaning device to switch to the outer boundary exploration mode; or controlling the cleaning device to retreat or turn around and move forward until the substance boundary point is detected, and triggering the cleaning device to switch to the outer boundary exploration mode. An exploration direction of the cleaning device in the outer boundary exploration mode is opposite to an exploration direction of the cleaning device in the inner boundary exploration mode.

In some embodiments, based on the foregoing solution, the controlling, in the inner boundary exploration mode and the outer boundary exploration mode, the cleaning device to detect the substance boundary point in the predetermined direction includes: controlling, in the inner boundary exploration mode, the cleaning device to move in a first predetermined direction to detect the substance boundary point, the first predetermined direction including a clockwise direction or a counterclockwise direction; and controlling, in the outer boundary exploration mode, the cleaning device to move in a second predetermined direction to detect the substance boundary point, the second predetermined direction being opposite to the first predetermined direction.

In some embodiments, based on the foregoing solution, the method further includes: monitoring, in the outer boundary exploration mode, a first angle variation of an orientation of the cleaning device in a detection process; and controlling, if the cleaning device fails to detect the substance boundary point and the first angle variation exceeds a first angle threshold, the cleaning device to rotate in place in the second predetermined direction until the substance boundary point is detected.

In some embodiments, based on the foregoing solution, the method further includes: recording a second angle variation of the orientation of the cleaning device in a process of the cleaning device rotating in place in the second predetermined direction; controlling, if the second angle variation of the orientation of the cleaning device when the substance boundary point is detected exceeds a second angle threshold, the cleaning device to rotate in place in the first predetermined direction until a new substance boundary point is detected, and recording the newly detected substance boundary point to the substance boundary point collection; or recording, in case the substance boundary point is detected during a process of the cleaning device rotating in place in the second predetermined direction, a currently detected substance boundary point to the substance boundary point collection, and controlling the cleaning device to rotate in place in the first predetermined direction until a new substance boundary point is detected, to adjust an exploration direction of the cleaning device and switch to the inner boundary exploration mode.

In some embodiments, based on the foregoing solution, the method further includes: monitoring, in the inner boundary exploration mode, a third angle variation of an orientation of the cleaning device in a detection process; and controlling, if the cleaning device fails to detect the substance boundary point and the third angle variation exceeds a third angle threshold, the cleaning device to rotate in place in the first predetermined direction until the substance boundary point is detected.

In some embodiments, based on the foregoing solution, the method further includes: recording a fourth angle variation of the orientation of the cleaning device in a process of the cleaning device rotating in place in the first predetermined direction; controlling, if the fourth angle variation of the orientation of the cleaning device when the substance boundary point is detected exceeds a fourth angle threshold, the cleaning device to rotate in place in the second predetermined direction until a new substance boundary point is detected, and recording the newly detected substance boundary point to the substance boundary point collection; or recording, in case the substance boundary point is detected in a process of the cleaning device rotating in place in the first predetermined direction, a currently detected substance boundary point to the substance boundary point collection, and controlling the cleaning device to rotate in place in the second predetermined direction until a new substance boundary point is detected, to adjust an exploration direction of the cleaning device and switch to the outer boundary exploration mode.

In some embodiments, based on the foregoing solution, the controlling the cleaning device to detect the substance boundary point in the predetermined direction includes: controlling the cleaning device to detect the substance boundary point in the predetermined direction until the cleaning device interrupts the exploration, or until a distance between a substance boundary point currently detected by the cleaning device and a first detected substance boundary point is less than a preset distance threshold.

In some embodiments, based on the foregoing solution, the substance boundary point includes a preset substance boundary point and a non-preset substance boundary point, the preset substance boundary point is a substance boundary point detected by the cleaning device in the inner boundary exploration mode, and the non-preset substance boundary point is a substance boundary point detected by the cleaning device in the outer boundary exploration mode.

In some embodiments, based on the foregoing solution, the determining the contour of the preset substance based on the substance boundary point collection includes: determining the contour of the preset substance based on the preset substance boundary point in the substance boundary point collection; or determining the contour of the preset substance based on the non-preset substance boundary point in the substance boundary point collection; or determining the contour of the preset substance based on the preset substance boundary point and the non-preset substance boundary point in the substance boundary point collection.

In some embodiments, based on the foregoing solution, the determining the contour of the preset substance based on the substance boundary point collection includes: connecting each substance boundary point in a sequence that the substance boundary points in the substance boundary point collection are detected, to determine the contour of the preset substance; or generating convex hull data based on each substance boundary point in the substance boundary point collection, and determining the contour of the preset substance based on the convex hull data; or performing fitting processing on each substance boundary point in the substance boundary point collection, to determine the contour of the preset substance; or performing graph matching processing on each substance boundary point in the substance boundary point collection, to determine the contour of the preset substance.

In some embodiments, based on the foregoing solution, the method further includes: determining, if an exploration of the preset substance by the cleaning device is interrupted, an explored contour of the preset substance based on a detected substance boundary point collection; and exploring an unexplored preset substance based on the explored contour of the preset substance.

In some embodiments, based on the foregoing solution, the exploring the unexplored preset substance based on the explored contour of the preset substance includes: determining a first substance boundary point that is first detected on the explored contour of the preset substance and a second substance boundary point that is last detected on the explored contour of the preset substance, and defining a connection line between the first substance boundary point and the second substance boundary point as an inner edge line of the unexplored preset substance; and determining a contour of an explored area of the preset substance based on the detected substance boundary points and the inner edge line, and exploring the unexplored preset substance based on the contour of the explored area of the preset substance.

In some embodiments, based on the foregoing solution, the method further includes: obtaining contours of the preset substance determined by the cleaning device in an exploration; and splicing, if there is a common contour line between any two contours of the preset substance, the any two contours of the preset substance to obtain a spliced contour of the preset substance.

In some embodiments, based on the foregoing solution, a detection trajectory of the cleaning device detecting the substance boundary point in the predetermined direction includes an arc trajectory.

According to a second aspect, an embodiment of the present disclosure provides an apparatus for exploring a substance contour on ground, including: a triggering unit, configured to trigger, in response to a cleaning device detecting a preset substance, the cleaning device to alternately switch between an inner boundary exploration mode and an outer boundary exploration mode; a controlling unit, configured to control, in the inner boundary exploration mode and the outer boundary exploration mode, the cleaning device to detect a substance boundary point in a predetermined direction, to obtain a substance boundary point collection; and a determining unit, configured to determine a contour of the preset substance based on the substance boundary point collection.

According to a third aspect, an embodiment of the present disclosure provides a computer-readable storage medium, the computer-readable storage medium being stored with computer-executable instructions. The computer-executable instructions, when being executed by a processor, implement the operations of the method according to any of the foregoing embodiments in the first aspect.

According to a fourth aspect, an embodiment of the present disclosure provides a cleaning device, including: one or more processors and one or more memories, the one or more memories storing computer-executable instructions. The computer-executable instructions, when being executed by the one or more processors, implement the operations of the method according to any of the foregoing embodiments in the first aspect.

In the present disclosure, the cleaning device alternately switches between the inner boundary exploration mode and the outer boundary exploration mode in the process of exploring the contour of the preset substance on ground. In the inner boundary exploration mode and the outer boundary exploration mode, the cleaning device is controlled to detect the substance boundary points along predetermined direction. After collecting all the substance boundary points to obtain the substance boundary point collection, the data processing is performed on the substance boundary points in the substance boundary point collection so as to obtain the contour of the preset substance. By way of the technical solution of the present disclosure, the cleaning device can be controlled to explore the contour of the preset substance on ground during moving. Based on this, the in-situ rotation of the cleaning device is reduced, thus ineffective exploration of the cleaning device is reduced, thereby improving the efficiency of exploring the substance contour on ground.

It should be understood that the general description above and the detailed description below are illustrative and explanatory and do not limit the present disclosure.

BRIEF DESCRIPTION OF THE DRAWINGS

The drawings herein are incorporated in and constitute a part of the specification. They illustrate embodiments that comply with the present disclosure, and are used together with the specification to explain the principles of the present disclosure. Obviously, these drawings are merely some embodiments of the present disclosure. Those skilled in the art can obtain other drawings based on these drawings without creative efforts.

FIG. 1(a)-FIG. 1(c) show schematic structural diagrams of a sweeping robot in different views according to an embodiment of the present disclosure.

FIG. 2 shows a flowchart of a method for exploring a substance contour on ground according to an embodiment of the present disclosure.

FIG. 12 shows a schematic diagram of performing fitting processing on each substance boundary point in a substance boundary point collection to determine a contour of a preset substance according to an embodiment of the present disclosure.

FIG. 13 shows a schematic diagram of performing graph matching processing on each substance boundary point in a substance boundary point collection to determine a contour of a preset substance according to an embodiment of the present disclosure.

FIG. 14 shows a flowchart of a method for exploring a substance contour on ground according to an embodiment of the present disclosure.

DETAILED DESCRIPTION OF THE EMBODIMENTS

Figure 3:
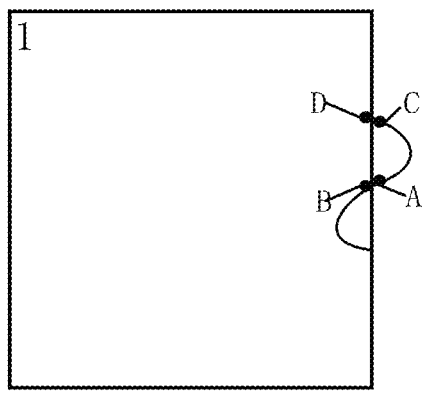
FIG. 3 shows a schematic diagram of preset substance boundary points and non-preset substance boundary points according to an embodiment of the present disclosure.

The technical solution of the embodiments of the present disclosure will be described clearly and completely with reference to the accompanying drawings in the embodiments of the present disclosure. Obviously, the described embodiments are only a part of the embodiments of the present disclosure rather than all of them. Based on these embodiments in the present disclosure, all other embodiments obtained by those skilled in the art without creative efforts shall fall within the scope of protection of the present disclosure.

Furthermore, the described features, structures, or features may be combined in any suitable manners in one or more embodiments. In the following description, the specific details are provided for a thorough understanding of the embodiments of the present disclosure. However, those skilled in the art will appreciate that the technical solution of the present disclosure may be practiced without one or more of the specific details, or may use other methods, components, apparatus, steps, and the like. In other instances, well-known methods, apparatuses, implementations, or operations are not shown or described in detail to avoid obscuring the aspects of the present disclosure.

The block diagrams shown in the drawings are merely functional entities and do not necessarily correspond to physically separate entities. That is, these functional entities may be implemented in software form, or in one or more hardware modules or integrated circuits, or in different networks and/or processors and/or microcontrollers.

The flowcharts shown in the drawings are merely illustrative and do not necessarily include all of the contents and the operations/steps, nor do they have to be performed in the order described. For example, some operations/steps may be further decomposed, and some operations/steps may be combined or partially combined, such that the actual order may be changed according to actual situations.

In the description of the present disclosure, it should be understood that the terms "first" and "second" are merely for the purpose of description and cannot be construed as indicating or implying relative importance or implicitly indicating the number of the indicated technical features. Thus, the features defined by "first" and "second" may explicitly or implicitly include at least one such feature. In the description of the present disclosure, "a plurality of" means two or more than two, unless otherwise specified.

In the description of the present disclosure, it should be understood that the terms "step 1, step 2 . . . " are merely for the purpose of description and cannot be construed as indicating or implying relative importance or implicitly indicating an execution sequence of the indicated technical features.

Some embodiments of the present disclosure will be described in detail below with reference to the accompanying drawings. In the case of no conflict, the following embodiments and the features in these embodiments can be combined with each other.

The embodiments of the present disclosure provide a method and apparatus for exploring a substance contour on ground, and a cleaning device. The method may be applied to an intelligent cleaning device, such as a sweeping robot, which is not limited herein.

First, in order to make those skilled in the art better understand the control solution of the cleaning device of the present disclosure, the structure of a sweeping robot, as an example of the cleaning device, will be briefly described below with reference to FIG. 1(a)-FIG. 1(c).

FIG. 1(a)-FIG. 1(c) show structural schematic diagrams of a sweeping robot in different views according to an embodiment of the present disclosure.

In particular, FIG. 1(a) shows a perspective view of the sweeping robot, FIG. 1(b) shows a bottom view of the sweeping robot, and FIG. 1(c) shows a schematic diagram of the internal structure of the sweeping robot.

Illustratively, the technical solution of the present disclosure may be applied to a sweeping robot 100, which mainly includes: an ultrasonic sensor 101, a drop sensor 102, driving wheels 103, a mopping member 104, a universal wheel 105, a distance sensor 106, a collision sensor 107, a dust box 108, a fan 109, a side brush 110, a roller brush 111, a dust suction port 112, and the like.

The ultrasonic sensor 101 may be configured to detect obstacles, in particular, detect a preset substance (such as a carpet) in the present disclosure. In some embodiments, the ultrasonic sensor 101 is disposed at the bottom of the front end of the sweeping robot 100, as shown in FIG. 1(b).

The drop sensor 102 is located at the bottom edge of a main body of the sweeping robot 100. There may be one or more drop sensors. The drop sensor 102 may detect whether there is a risk of the sweeping robot 100 falling down from a high place when the sweeping robot 100 moves to the edge of the floor, to allow the sweeping robot 100 to execute a corresponding action to prevent falling down. For example, the sweeping robot 100 stops moving or moves away from the edge position.

Each driving wheel 103 is provided with a driving wheel motor to drive the driving wheel 103 to rotate, then to drive the sweeping robot 100 to move. Besides, the driving wheels 103 and the universal wheel 105 may cooperate to make the sweeping robot 100 move and steer. The driving wheels 103 rotate to drive the sweeping robot 100 to move forward or backward, and a difference in the rotational speeds between a left driving wheel 103 and a right driving wheel 103 may be controlled to realize a steering angle of the sweeping robot 100.

The sweeping robot 100 is provided with a dust suction apparatus which includes the dust box 108 and the fan 109. When the side brush 110 and/or the roller brush 111 disposed at the bottom of the sweeping robot 100 start to rotate, the rotated side brush 110 and/or the roller brush 111 can sweep dust and other garbage to the vicinity of the dust suction port 112 located at the bottom of the sweeping robot 100. By way of the suction effect of the fan 109, the garbage is sucked into the dust suction port 112, and enters the dust box 108 through the dust suction port 112 to be stored temporarily.

The distance sensor 106 may be an infrared ranging sensor, an ultrasonic ranging sensor, a laser ranging sensor, a depth sensor, or the like. The distance sensor 106 may be configured to detect a distance from an obstacle to the distance sensor 106. The distance sensor 106 is disposed on a side of the main body of the sweeping robot 100, such that the distance sensor 106 can measure the distance from the obstacle located near the side of the sweeping robot 100 to the distance sensor 106.

The collision sensor 107 includes a collision case 107A and a trigger sensor 107B. The collision case 107A is disposed at the front of the main body of the sweeping robot 100, in particular, around the front of the main body and a front portion of a side edge. For example, the collision case 107A is disposed at the front end of the main body of the sweeping robot 100, and the respective front portion of the left and right sides of the main body. The trigger sensor 107B is disposed inside the main body of the sweeping robot 100 and located behind the collision case 107A. An elastic buffer member, such as a spring or an elastic sheet, is provided between the collision case 107A and the main body of the sweeping robot 100. In case the collision case 107A collides with an obstacle, the collision case 107A will move toward the interior of the robot such that the elastic buffer member is compressed. The collision case 107A will contact with the trigger sensor 107B after the collision case 107A moves a certain distance toward the interior of the robot, so as to trigger the trigger sensor 107B to generate a collision signal. The collision signal may be sent to the controller of the sweeping robot 100 to be processed. If not triggered, the trigger sensor 107B outputs a low-level signal; if triggered, the trigger sensor 107B outputs a high-level signal. The sweeping robot 100 moves away from the obstacle upon colliding with the obstacle, and the collision case will move back to its original position under the action of the elastic buffer member. As can be seen, the collision sensor 107 can detect obstacles, and serve as a cushion when it collides with obstacles.

It can be understood that the sweeping robot 100 may have other structures, which is not limited herein.

Referring to FIG. 2, it shows a flowchart of a method for exploring a substance contour on ground according to an embodiment of the present disclosure. The method includes step 210 to step 230.

Step 210, a cleaning device is triggered to alternately switch between an inner boundary exploration mode and an outer boundary exploration mode in response to detecting a preset substance.

In the present disclosure, the preset substance may be a carpet, a floor tile made of special material, a foot mat, a crawling mat, a summer mat, or any other substance whose contour needs to be explored by the cleaning device, which is not limited herein.

In an embodiment of the present disclosure, the inner boundary exploration mode may refer to that a sensor of the cleaning device, which is configured for detecting obstacle, performs an edge exploration on the preset substance within the preset substance. In the inner boundary exploration mode, a trajectory of the orthographic projection of the sensor of the cleaning device for obstacle detection overlaps with an orthographic projection of the preset substance by at least 50%. Correspondingly, the outer boundary exploration mode may refer to that the sensor of the cleaning device, which is configured for detecting obstacle, performs the edge exploration on the preset substance within a non-preset substance (namely, outside the preset substance). In the outer boundary exploration mode, the trajectory of the orthographic projection of the sensor of the cleaning device for obstacle detection overlaps with an orthographic projection of the non-preset substance by at least 50%.

In the present disclosure, the cleaning device may detect the preset substance through various technical means. For example, the cleaning device may detect the preset substance by the sensor (such as an ultrasonic sensor, a photo-sensitive sensor), which is not limited herein.

It should be noted that, the cleaning device in the present disclosure may detect the preset substance from outside the preset substance or from inside the preset substance. In case the cleaning device detects the preset substance from outside the preset substance, when a preset substance signal is detected by the sensor of the cleaning device for obstacle detection, it is considered that the cleaning device has detected the preset substance and reached the edge of the preset substance. In case the cleaning device detects the preset substance from inside the preset substance, when a non-preset substance signal is detected by the sensor of the cleaning device for obstacle detection, it is considered that the cleaning device has detected the non-preset substance and reached the edge of the preset substance.

A carpet is described as an example of the preset substance. In case the cleaning device starts to perform a carpet contour exploration from inside the carpet, when a non-carpet signal is detected by the sensor of the cleaning device for obstacle detection, it is considered that the cleaning device has detected a non-carpet substance and reached the edge of the carpet, and the cleaning device is triggered to alternately switch between the inner boundary exploration mode and the outer boundary exploration mode to explore the contour of the carpet. In case the cleaning device starts to perform the carpet contour exploration from outside the carpet, when a carpet signal is detected by the sensor of the cleaning device for obstacle detection, it is considered that the cleaning device has detected the carpet and reached the edge of the carpet, and the cleaning device is triggered to alternately switch between the inner boundary exploration mode and the outer boundary exploration mode to explore the contour of the carpet.

In the present disclosure, in a state of constructing a cleaning area map, if a preset substance is detected by the cleaning device during moving, the cleaning device will not explore the contour of the detected preset substance. It can be understood that a traveling route and a cleaning trajectory of the cleaning device is determined based on the cleaning area map. Before performing a cleaning task, a newly purchased cleaning device needs to explore its surrounding environment, so as to construct an initial cleaning area map. The construction efficiency of the cleaning area map will be improved by not exploring the contour of any preset substance during the construction of the cleaning area map.

In the present disclosure, when the preset substance is detected by the cleaning device during moving, if the contour information of the preset substance is recorded in a substance contour exploration record of the cleaning device, and a time interval between the time of recording the contour information of the preset substance and the current time is less than a preset period of time, the contour of the preset substance will not be explored; if the contour information of the preset substance is recorded in the substance contour exploration record of the cleaning device, and the time interval between the time of recording the contour of the preset substance and the current time is greater than the preset period of time, the contour of the preset substance will be re-explored.

In the present disclosure, if the cleaning device does not react to a preset substance detected in the process of moving or performing a cleaning task, the cleaning device or the preset substance may be damaged. For example, in case the preset substance is a carpet, the cleaning device may get stuck by the carpet when moving on the carpet, or the cleaning device, when performing a mopping task, may wet the carpet during mopping. Therefore, a contour exploration of a particular substance can protect the cleaning device and the substance to a certain extent.

In the present disclosure, when the preset substance is detected by the cleaning device during moving, it indicates that the cleaning device has reached the edge of the preset substance, and the cleaning device is triggered to alternately switch between the inner boundary exploration mode and the outer boundary exploration mode, to start exploring the preset substance. After determining the position and the contour of the preset substance based on an exploration result, the cleaning device may update the contour information of the preset substance to the cleaning area map of the cleaning device. As such, when planning a travelling trajectory or a cleaning trajectory, the cleaning device may design a route to avoid the substance or design a behavior of cleaning the substance based on the position and the contour of the preset substance.

It can be understood that the working environment for the cleaning device is dynamic. By way of the technical solution provided by the present disclosure, the cleaning device can treat the preset substance in a particular way, regularly update the record of exploration for the substance contour, and update the explored contour of the preset substance to the cleaning area map. This prevents the cleaning device from repeatedly exploring the contour of the preset substance, thereby improving the working efficiency of the cleaning device.

Continuing to refer to FIG. 2, in step 220, in the inner boundary exploration mode and the outer boundary exploration mode, the cleaning device is controlled to detect a substance boundary point in a predetermined direction, to obtain a substance boundary point collection.

In the present disclosure, the substance boundary point includes a preset substance boundary point and a non-preset substance boundary point. The preset substance boundary point is a substance boundary point detected by the cleaning device in the inner boundary exploration mode, and the non-preset substance boundary point is a substance boundary point detected by the cleaning device in the outer boundary exploration mode.

It should be noted that, the preset substance boundary point is the substance boundary point determined when a non-preset substance signal is detected by the cleaning device in the inner boundary exploration mode, and the determined substance boundary point may be the coordinate of the cleaning device when the non-preset substance signal is detected by the sensor of the cleaning device for obstacle detection, or the coordinate of the cleaning device at a predetermined time before the non-preset substance signal is detected by the sensor of the cleaning device for obstacle detection. The non-preset substance boundary point is the substance boundary point determined when a preset substance signal is detected by the cleaning device in the outer boundary exploration mode, and the determined substance boundary point may be the coordinate of the cleaning device when the preset substance signal is detected by the sensor of the cleaning device for obstacle detection, or the coordinate of the cleaning device at a predetermined time before the preset substance signal is detected by the sensor of the cleaning device for obstacle detection. In some embodiments, the coordinate of the cleaning device may be represented by the coordinate of the sensor of the cleaning device for obstacle detection.

In order to provide a better understanding for those skilled in the art, an embodiment is described below with reference to FIG. 3.

Referring to FIG. 3, it shows a schematic diagram of preset substance boundary points and non-preset substance boundary points according to an embodiment of the present disclosure.

As shown in FIG. 3, the cleaning device exploring the contour of a preset substance 1 is illustrated as an example. A point A and a point B are the preset substance boundary points, namely, the substance boundary points determined when the non-preset substance signal is detected by the cleaning device in the inner boundary exploration mode. The point A is a coordinate position of the cleaning device when the non-preset substance signal is detected by the sensor of the cleaning device for obstacle detection, and the point B is a coordinate position of the cleaning device at the predetermined time before the non-preset substance signal is detected by the sensor of the cleaning device for obstacle detection.

Continuing to refer to FIG. 3, a point C and a point D are the non-preset substance boundary points, namely, the substance boundary points determined when the preset substance signal is detected by the cleaning device in the outer boundary exploration mode. The point C is a coordinate position of the cleaning device when the preset substance signal is detected by the sensor of the cleaning device for obstacle detection, and the point D is a coordinate position of the cleaning device at the predetermined time before the preset substance signal is detected by the sensor of the cleaning device for obstacle detection.

It should be noted that, the following embodiments are all illustrated with that the coordinate of the cleaning device when the non-preset substance signal being detected by the sensor of the cleaning device for obstacle detection is taken as the preset substance boundary point, and the coordinate of the cleaning device when the preset substance signal being detected by the sensor of the cleaning device for obstacle detection is taken as the non-preset substance boundary point. It is to be noted that recording the preset substance boundary points and the non-preset substance boundary points by the cleaning device in the process of exploring the preset substance to obtain a collection of substance boundary points, as opposed to recording only the preset substance boundary points as a collection of substance boundary points or recording only the non-preset substance boundary points as a collection of substance boundary points, can result in a more dense spacing of the substance boundary points, which can in turn improve the accuracy of the cleaning device in exploring the contour of the preset substance.

In the present disclosure, after receiving an instruction of exploring the contour of the preset substance (the instruction may be sent by a user via an application or a voice reminder or a short messaging service. Or the contour exploring for the preset substance is spontaneously performed by the cleaning device), the cleaning device starts to explore the preset substance from outside the preset substance, or starts to explore the non-preset substance from inside the preset substance.

In some embodiments, if the preset substance signal is detected by the cleaning device from outside the preset substance for the first time, the coordinate point of the sensor of the cleaning device is determined as a first substance boundary point, and the cleaning device is triggered to alternately switch between the inner boundary exploration mode and the outer boundary exploration mode to explore the contour of the preset substance. If the non-preset substance signal is detected by the cleaning device from inside the preset substance for the first time, the coordinate point of the sensor of the cleaning device is determined as the first substance boundary point, and the cleaning device is triggered to alternately switch between the inner boundary exploration mode and the outer boundary exploration mode to explore the contour of the preset substance.

In some other embodiments, if the preset substance signal is detected by the cleaning device from outside the preset substance for the first time, the cleaning device is controlled to perform a scheduled action until the non-preset substance is detected, and the cleaning device is determined being located at the edge of the preset substance. The current coordinate of the sensor of the cleaning device is determined as the first substance boundary point, and the cleaning device is triggered to alternately switch between the inner boundary exploration mode and the outer boundary exploration mode to explore the contour of the preset substance. If the non-preset substance signal is detected by the cleaning device from inside the preset substance for the first time, the cleaning device is controlled to perform a scheduled action until the preset substance is detected, and the cleaning device is determined being located at the edge of the preset substance. The current coordinate of the sensor of the cleaning device is determined as the first substance boundary point, and the cleaning device is triggered to alternately switch between the inner boundary exploration mode and the outer boundary exploration mode to explore the contour of the preset substance. The scheduled action includes but is not limited to retreating and rotating, as long as after the preset substance signal is detected for the first time, the non-preset substance signal can be detected by performing the scheduled action, or as long as after the non-preset substance signal is detected for the first time, the preset substance signal can be detected by performing the scheduled action. In case the non-preset substance signal is detected by performing the scheduled action after the preset substance signal is detected for the first time, or the preset substance signal is detected by performing the scheduled action after the non-preset substance signal is detected for the first time, the cleaning device may be determined being located at the edge of the preset substance, and the cleaning device may be triggered to alternately switch between the inner boundary exploration mode and the outer boundary exploration mode to explore the contour of the preset substance.

It can be understood that, after the cleaning device is triggered to alternately switch between the inner boundary exploration mode and the outer boundary exploration mode, the cleaning device may immediately start to explore the contour of the preset substance, or may first determine the initial exploration mode and then start to explore the contour of the preset substance.

In some embodiments, the cleaning device may determine the initial exploration mode based on preset configuration information. The preset configuration information of the cleaning device may include: a motion direction and a speed (including an angular velocity and a linear velocity) of the cleaning device during performing the scheduled action or detecting the first substance boundary point, an orientation of the front end of the cleaning device when the cleaning device locates at the edge of the preset substance, a signal of the substance detected by the sensor for obstacle detection, a layout of surrounding obstacles monitored by a distance sensor or a radar, and the like. The initial exploration mode includes a rightward inner boundary exploration mode, a rightward outer boundary exploration mode, a leftward inner boundary exploration mode, and a leftward outer boundary exploration mode. Taking the sensor of the cleaning device for obstacle detection as a reference, the travel of the cleaning device toward the right of the sensor is defined as the rightward travel of the cleaning device, and the travel of the cleaning device toward the left of the sensor is defined as the leftward travel of the cleaning device. Different ways of determining the initial exploration mode may also be devised on a case-by-case basis, which is not limited herein.

In particular, in order to provide a better understanding for those skilled in the art, an embodiment is described below with reference to FIG. 4(a)-FIG. 4(f).

Referring to FIG. 4(a)-FIG. 4(f), they show schematic diagrams of scenes of determining an initial exploration mode of a cleaning device according to an embodiment of the present disclosure.

As shown in FIG. 4(a)-FIG. 4(f), a sweeping robot in the cleaning device is illustrated as an example. The small black dot E in each figure represents a sensor of the sweeping robot for obstacle detection (or the front end the sweeping robot), and the number 1 represents a preset substance.

Figure 4A:
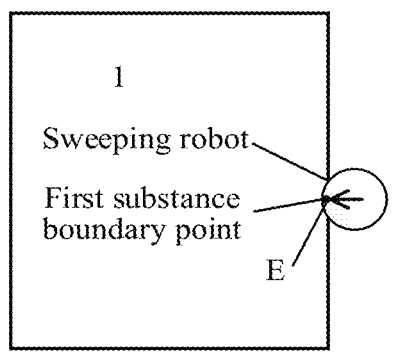
FIG. 4(a)-FIG. 4(f) show schematic diagrams of scenes of determining an initial exploration mode of a cleaning device according to an embodiment of the present disclosure.
Figure 4B:
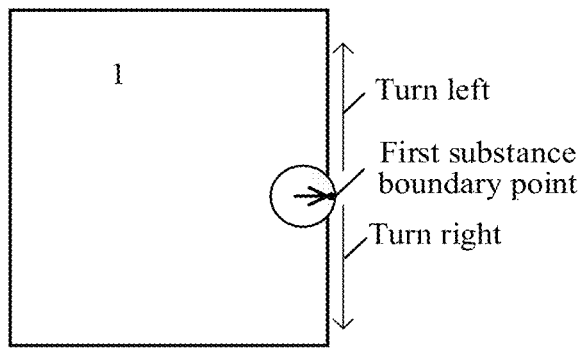
Figure 4C:
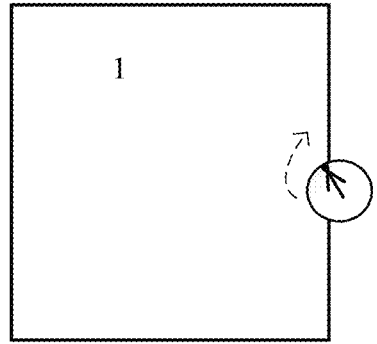

FIG. 4(a) corresponds to the scene in which a preset substance signal is detected by the sensor of the sweeping robot for obstacle detection from outside the preset substance 1, and the current coordinate of the sensor of the sweeping robot for obstacle detection is determined as the first substance boundary point. FIG. 4(b) corresponds to the scene in which a non-preset substance signal is detected by the sensor of the sweeping robot for obstacle detection from inside the preset substance 1, and the current coordinate of the sensor of the sweeping robot for obstacle detection is determined as the first substance boundary point.

It should be noted that, the first substance boundary point is recorded when the preset substance 1 is detected by the sweeping robot. Then, the sweeping robot needs to determine the initial exploration mode for exploring the preset substance 1, and alternately switches between the inner boundary exploration mode and the outer boundary exploration mode to obtain more substance boundary points.

Figure 4D:
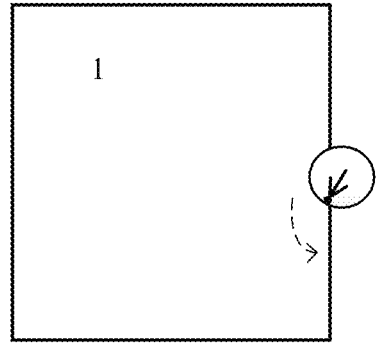
Figure 4E:
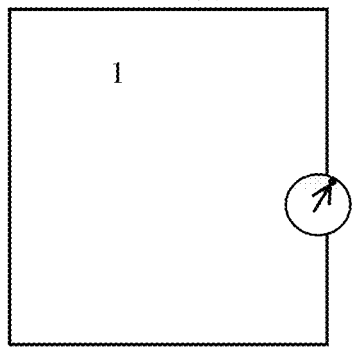
Figure 4F:
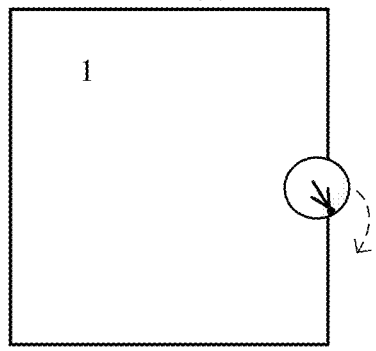

Continuing to refer to FIG. 4(c)-FIG. 4(f), FIG. 4(c) corresponds to the scene in which the sweeping robot determines the rightward inner boundary exploration mode as the initial exploration mode after detecting the first substance boundary point. FIG. 4(d) corresponds to the scene in which the sweeping robot determines the leftward inner boundary exploration mode as the initial exploration mode after detecting the first substance boundary point. FIG. 4(e) corresponds to the scene in which the sweeping robot determines the left outer boundary exploration mode as the initial exploration mode after detecting the first substance boundary point. FIG. 4(f) corresponds to the scene in which the sweeping robot determines the right outer boundary exploration mode as the initial exploration mode after detecting the first substance boundary point.

With reference to FIG. 4(a)-FIG. 4(f), it can be understood that the sweeping robot may select the initial exploration mode based on the preset configuration information. Illustratively, as shown in FIG. 4(a), when the preset substance signal being detected by the sensor of the sweeping robot is determined as that the preset substance has been detected, the initial exploration mode is determined to be the leftward inner boundary exploration mode or the rightward inner boundary exploration mode, or the initial exploration mode is determined to be the leftward inner boundary exploration mode or the rightward inner boundary exploration mode in combination a consideration with the layout of the obstacles around the cleaning device monitored by the distance sensor or the radar (to keep away from the obstacles or keep away from the obstacles with a denser layout). As shown in FIG. 4(b), when the non-preset substance signal being detected by the sensor of the sweeping robot is determined as that the preset substance has been detected, the initial exploration mode is determined to be the left outer boundary exploration mode or the right outer boundary exploration mode, or the initial exploration mode may be determined to be the leftward inner boundary exploration mode or the rightward inner boundary exploration mode in combination a consideration with the layout of the obstacles around the cleaning device monitored by the distance sensor or the radar (to keep away from the obstacles or keep away from the obstacles with a denser layout). In the embodiments, the cleaning device may also randomly select the initial exploration mode, which is not limited herein.

It should be noted that, in some embodiments, after the cleaning device finishing a selection of initial exploration mode, the cleaning device may rotate or move to adjust its orientation or position to match an exploration direction (for example, a first predetermined direction or a second predetermined direction). Illustratively, in the scene as shown in FIG. 4(a), the rightward inner boundary exploration mode is selected as the initial exploration mode, and the sweeping robot rotates clockwise to adjust its orientation to adapt for the inner boundary exploration mode.

In the embodiments of the present disclosure, selecting the initial exploration mode based on the preset configuration information of the cleaning device can reduce ineffective motions of the cleaning device. For example, in case the preset substance is detected from outside the preset substance, the cleaning device can be prevented from selecting the outer boundary exploration mode as the initial exploration mode. This reduces the exploration time of the cleaning device, or reduces the possibility that the exploration process is interrupted by the surrounding obstacles, thereby improving the exploration efficiency of the cleaning device.

In an embodiment, in the inner boundary exploration mode and the outer boundary exploration mode, the controlling the cleaning device to detect the substance boundary point in the predetermined direction may be implemented as follows:

in the inner boundary exploration mode, the cleaning device is controlled to move in the first predetermined direction to detect the substance boundary point, and the first predetermined direction includes the clockwise direction and the counterclockwise direction; and in the outer boundary exploration mode, the cleaning device is controlled to move in the second predetermined direction to detect the substance boundary point, and the second predetermined direction is opposite to the first predetermined direction.

Figure 5A:
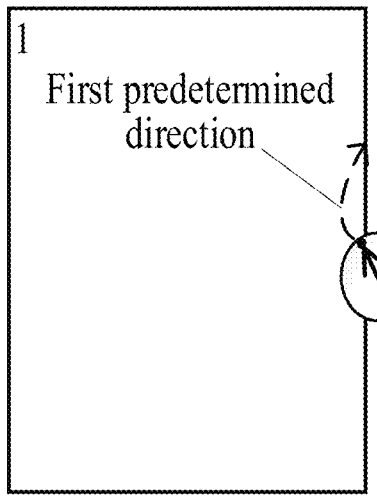
FIG. 5(a)-FIG. 5(b) show schematic diagrams of scenes of controlling a cleaning device to detect a substance boundary point along a predetermined direction according to an embodiment of the present disclosure.
Figure 5B:
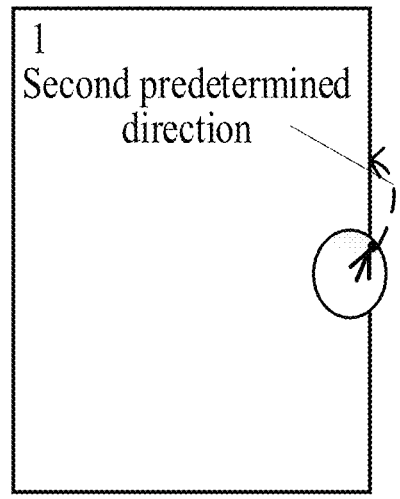

A description with reference to FIG. 5(a)-FIG. 5(b) is provided in the following to provide a better understanding for those skilled in the art to the present disclosure.

Referring to FIG. 5(a) to FIG. 5(b), they show schematic diagrams of scenes of controlling a cleaning device to detect a substance boundary point along a predetermined direction according to an embodiment of the present disclosure.

FIG. 5(a) corresponds to the scene in which the sweeping robot takes the rightward inner boundary exploration mode as the initial exploration mode after detecting the first substance boundary point. The sweeping robot will be controlled to move in the clockwise direction as the first predetermined direction to detect the next substance boundary point in the inner boundary exploration mode. FIG. 5(b) corresponds to the scene in which the sweeping robot takes the leftward outer boundary exploration mode as the initial exploration mode after detecting the first substance boundary point. The sweeping robot will be controlled to move in the counterclockwise direction as the second predetermined direction to detect the next substance boundary point in the outer boundary exploration mode.

It can be understood that, after the first substance boundary point of the preset substance is detected, in case the cleaning device takes the leftward inner boundary exploration mode as the initial exploration mode for exploration, the cleaning device moves in the counterclockwise direction as the first predetermined direction; in case the cleaning device takes the rightward outer boundary exploration mode as the initial exploration mode for exploration, the cleaning device moves in the clockwise direction as the second predetermined direction.

It should be noted that, in some embodiments, during the process of exploring the preset substance, after the first substance boundary point is detected, it is determined to move in the first predetermined direction in the inner boundary exploration mode to detect the substance boundary points, and move in the second predetermined direction in the outer boundary exploration mode to detect the substance boundary points, then in this contour exploration for the preset substance, the cleaning device may always move in the first predetermined direction in the inner boundary exploration mode to detect the substance boundary points, and may always move in the second predetermined direction in the outer boundary exploration mode to detect the substance boundary points.

In an embodiment, a detection trajectory of the cleaning device detecting the substance boundary point in the predetermined direction may include an arc trajectory.

In particular, in the inner boundary exploration mode and the outer boundary exploration mode, the cleaning device may be controlled to move at a predetermined angular velocity and a predetermined linear velocity, to allow the cleaning device following an arc trajectory in which the cleaning device moves away from and then close to the edge of the preset substance to detect the substance boundary point. Illustratively, in the inner boundary exploration mode, the cleaning device may take the route in the first predetermined direction as shown in FIG. 5(a) as its travelling trajectory to detect the next substance boundary point.

It can be understood that, in the inner boundary exploration mode or the outer boundary exploration mode, if the cleaning device is controlled to move at a predetermined angular velocity which is gradually reduced and a predetermined linear velocity to detect the next substance boundary point, the exploration trajectory of the cleaning device may be a spiral trajectory; if the cleaning device is controlled to move at a predetermined angular velocity which is consistent and a predetermined linear velocity, the exploration trajectory of the cleaning device is an arc trajectory. In some embodiments, different exploration trajectories may be designed for the cleaning device according to different situations, which is not limited herein.

In an embodiment of the present disclosure, triggering the cleaning device to alternately switch between the inner boundary exploration mode and the outer boundary exploration mode may be implemented as follows:

the cleaning device is triggered to switch to the outer boundary exploration mode if at least one substance boundary point is detected in the inner boundary exploration mode; and the cleaning device is triggered to switch to the inner boundary exploration mode if at least one substance boundary point is detected in the outer boundary exploration mode.

In order to provide a better understanding for those skilled in the art, an embodiment is described below with reference to FIG. 6(a) to FIG. 6(b).

Figure 6A:
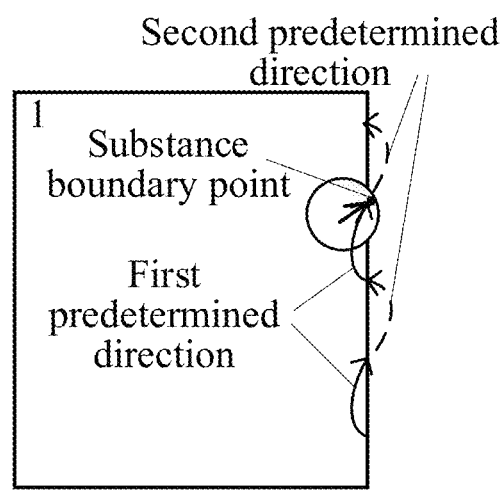
FIG. 6(a)-FIG. 6(b) show schematic diagrams of scenes of triggering a cleaning device to alternately switch between an inner boundary exploration mode and an outer boundary exploration mode according to an embodiment of the present disclosure.
Figure 6B:
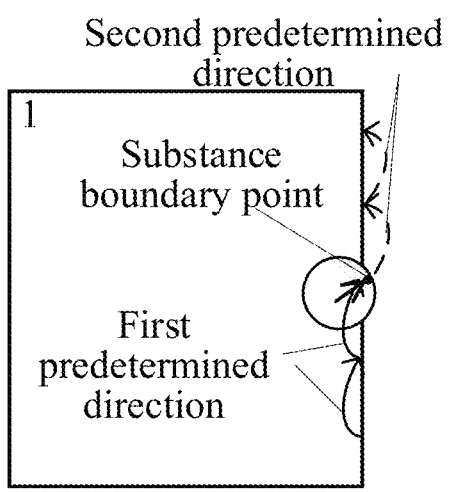

Referring to FIG. 6(a) to FIG. 6(b), they show schematic diagrams of scenes of triggering a cleaning device to alternately switch between an inner boundary exploration mode and an outer boundary exploration mode according to an embodiment of the present disclosure. It should be noted that, in this embodiment as shown in FIG. 6(a), a specific trigger condition for switching the cleaning device to the outer boundary exploration mode or switching the cleaning device to the inner boundary exploration mode is defined as follows:

The cleaning device is triggered to switch to the outer boundary exploration mode if one substance boundary point is detected in the inner boundary exploration mode. The cleaning device is triggered to switch to the inner boundary exploration mode if one substance boundary point is detected in the outer boundary exploration mode. As shown in FIG. 6(a), when the next substance boundary point (namely, the coordinate point of the cleaning device determined when the non-preset substance is detected by the cleaning device) is detected in a process of the sweeping robot moving in the clockwise direction as the first predetermined direction in the inner boundary exploration mode, the sweeping robot is triggered to switch to the outer boundary exploration mode, and moves in the counterclockwise direction as the second predetermined direction, to detect a substance boundary point after the next substance boundary point.

It can be understood that, in this embodiment, when the substance boundary point (namely, the coordinate point of the cleaning device determined when the preset substance is detected) is detected in the process of the sweeping robot moving in the counterclockwise direction as the second predetermined direction in the outer boundary exploration mode, the sweeping robot is triggered to switch to the inner boundary exploration mode. In this embodiment, the cleaning device alternately switches between the inner boundary exploration mode and the outer boundary exploration mode to obtain more substance boundary points of the preset substance.

It should be understood that, in an embodiment, the trigger condition for switching the cleaning device to the outer boundary exploration mode or switching the cleaning device to the inner boundary exploration mode may include others. For example, after multiple substance boundary points are continuously detected in the inner boundary exploration mode, the cleaning device is triggered to switch to the outer boundary exploration mode; after multiple substance boundary points are continuously detected in the outer boundary exploration mode, the cleaning device is triggered to switch to the inner boundary exploration mode, which may, for example, refer to FIG. 6(b).

With reference to the scene as shown in FIG. 6(b), it should be noted that the cleaning device detecting the substance boundary points in a continuous inner boundary exploration mode may include the following step 1 to step 3:

Step 1, the cleaning device is controlled to move in the first predetermined direction in the inner boundary exploration mode, and when a non-preset substance signal is detected by the sensor of the cleaning device for obstacle detection, the current coordinate of the cleaning device is determined as a substance boundary point.

Step 2, the cleaning device is controlled to rotate in place in the second predetermined direction until a preset substance signal is detected by the sensor of the cleaning device for obstacle detection, and the orientation of the front end of the cleaning device is adjusted to adapt to explore a next substance boundary point in the first predetermined direction in the inner boundary exploration mode. The current coordinate of the cleaning device may be recorded or may not be recorded as the substance boundary point.

Step 3, the step 1 is repeated to detect more substance boundary points.

After multiple substance boundary points are detected in the continuous inner boundary exploration mode, the cleaning device switches to a continuous outer boundary exploration mode to explore multiple substance boundary points.

The cleaning device detecting the substance boundary points in the continuous outer boundary exploration mode may include the following step 4 to step 6:

Step 4, the cleaning device is controlled to move in the second predetermined direction in the outer boundary exploration mode, and when a preset substance signal is detected by the sensor of the cleaning device for obstacle detection, the current coordinate of the cleaning device is determined as a substance boundary point.

Step 5, the cleaning device is controlled to rotate in place in the first predetermined direction until a non-preset substance signal is detected by the sensor of the cleaning device for obstacle detection, and the orientation of the front end of the cleaning device is adjusted to adapt to explore a next substance boundary point in the second predetermined direction in the outer boundary exploration mode. The current coordinate of the cleaning device may be recorded or may not be recorded as the substance boundary point.

Step 6, the step 4 is repeated to detect more substance boundary points.

Based on the foregoing embodiments, those skilled in the art can understand that the specific trigger condition for triggering the cleaning device to switch to the outer boundary exploration mode or triggering the cleaning device to switch to the inner boundary exploration mode is not limited to those listed above. The trigger condition can be determined according to actual needs.

In another embodiment, triggering the cleaning device to alternately switch between the inner boundary exploration mode and the outer boundary exploration mode may be carried out as follows:
- if an obstacle is detected by the cleaning device in the inner boundary exploration mode, the cleaning device is controlled to perform a first scheduled action until a substance boundary point is detected, then the cleaning device is triggered to switch to the outer boundary exploration mode; and
- if an obstacle is detected by the cleaning device in the outer boundary exploration mode, the cleaning device is controlled to perform a second scheduled action until a substance boundary point is detected, then the cleaning device is triggered to switch to the inner boundary exploration mode.

Further, in this embodiment, controlling the cleaning device to perform the first scheduled action may be realized in either of the following two ways.

In the first way, the cleaning device is controlled to rotate in place in the first predetermined direction until the substance boundary point is detected, then the cleaning device is triggered to switch to the outer boundary exploration mode.

In the second way, the cleaning device is controlled to retreat or turn around and move forward until the substance boundary point is detected, then the cleaning device is triggered to switch to the outer boundary exploration mode. The exploration direction of the cleaning device in the outer boundary exploration mode is opposite to the exploration direction of the cleaning device in the inner boundary exploration mode. It can be understood that, retreating means that the cleaning device maintains the current orientation of its front end and moves along a direction opposite to the current orientation of its front end. The cleaning device being controlled to retreat may be that the cleaning device retreats along the historical travelling trajectory, or retreats along a straight line, or retreats along the historical travelling trajectory for a predetermined distance and then along a straight line. Similarly, turning around means that the orientation of the front end of the cleaning device is rotated by 180°. The cleaning device being controlled to turn around and move forward may be that the cleaning device moves forward along the historical travelling trajectory after turning around, or moves forward along a straight line after turning around, or moves forward along the historical travelling trajectory for a predetermined distance and then along a straight line after turning around.

Further, in an embodiment, controlling the cleaning device to perform the second scheduled action may be realized in either of the following two ways:

In the first way, the cleaning device is controlled to rotate in place in the second predetermined direction until the substance boundary point is detected, then the cleaning device is triggered to switch to the inner boundary exploration mode.

In the second way, the cleaning device is controlled to retreat or turn around and move forward until the substance boundary point is detected, then the cleaning device is triggered to switch to the inner boundary exploration mode. The exploration direction of the cleaning device in the outer boundary exploration mode is opposite to the exploration direction of the cleaning device in the inner boundary exploration mode. It can be understood that, retreating means that the cleaning device maintains the current orientation of its front end and moves along a direction opposite to the current orientation of its front end. The cleaning device being controlled to retreat may be that the cleaning device retreats along the historical travelling trajectory, or retreats along a straight line, or retreats along the historical travelling trajectory for a predetermined distance and then along a straight line. Similarly, turning around means that the orientation of the front end of the cleaning device is rotated by 180°. The cleaning device being controlled to turn around and move forward may be that the cleaning device moves forward along the historical travelling trajectory after turning around, or moves forward along a straight line after turning around, or moves forward along the historical travelling trajectory for a predetermined distance and then along a straight line after turning around.

In order to provide a better understanding for those skilled in the art, an embodiment is described below with reference to FIG. 7(a) to FIG. 7(d).

Referring to FIG. 7(a) to FIG. 7(d), they show schematic diagrams of scenes of triggering a cleaning device to alternately switch between an inner boundary exploration mode and an outer boundary exploration mode when an obstacle is detected according to an embodiment of the present disclosure.

Figure 7A:
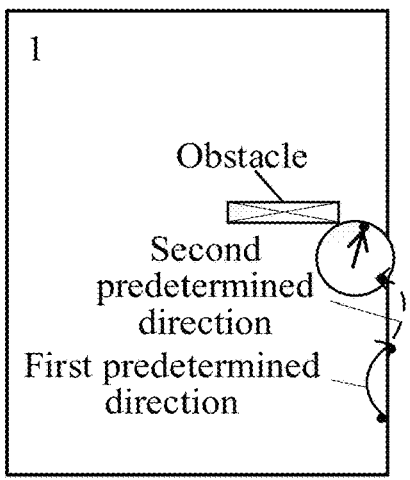
FIG. 7(a)-FIG. 7(d) show schematic diagrams of scenes of triggering a cleaning device to alternately switch between an inner boundary exploration mode and an outer boundary exploration mode when an obstacle is detected according to an embodiment of the present disclosure.
Figure 7B:
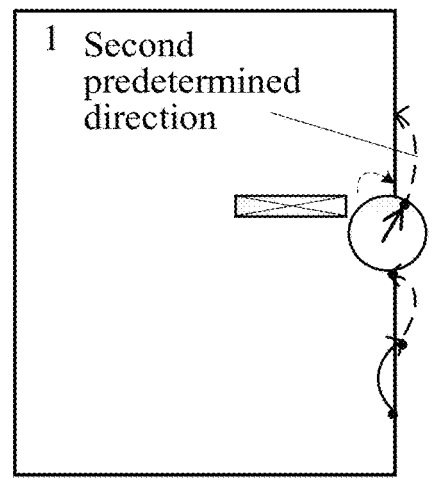
Figure 7C:
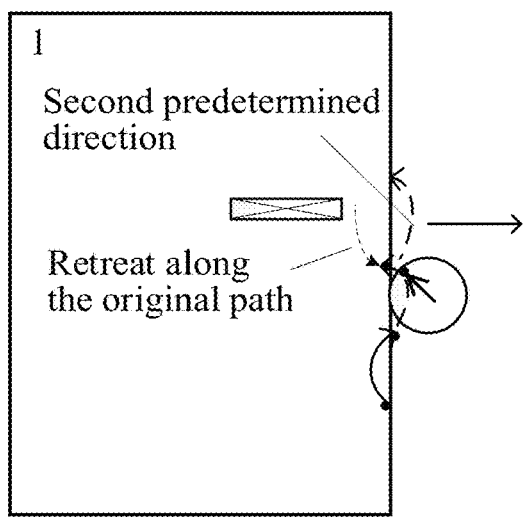
Figure 7D:
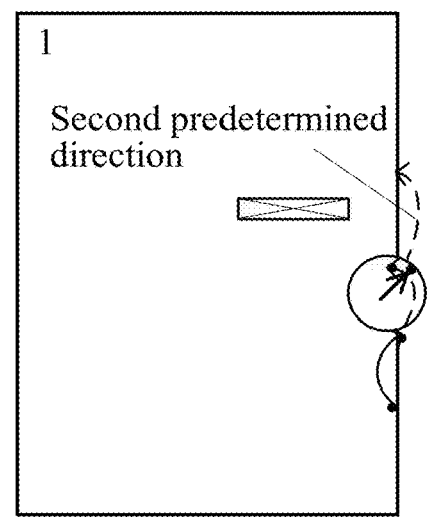

As shown in FIG. 7(a) to FIG. 7(d), an example in which an obstacle is detected by the sweeping robot in the inner boundary exploration mode is illustrated, where the clockwise direction is taken as the first predetermined direction, and the counterclockwise direction is taken as the second predetermined direction. FIG. 7(a) corresponds to the scene in which the obstacle is detected by the sweeping robot in the inner boundary exploration mode. FIG. 7(b) corresponds to the scene in which, after the obstacle is detected in the inner boundary exploration mode, the sweeping robot is controlled to rotate in place in the first predetermined direction until a substance boundary point is detected. FIG. 7(c) corresponds to the scene in which, after the obstacle is detected in the inner boundary exploration mode, the sweeping robot is controlled to retreat along the historical travelling trajectory until a substance boundary point is detected. FIG. 7(d) corresponds to the scene in which, after the obstacle is detected in the inner boundary exploration mode, the sweeping robot is controlled to retreat along the historical travelling trajectory until a substance boundary point is detected, the sweeping robot is controlled to switch to the outer boundary exploration mode from the inner boundary exploration mode, and the sweeping robot adjusts its orientation to adapt to the outer boundary exploration in the second predetermined direction.

It can be understood that, in the scene as shown in FIG. 7(c), when the substance boundary point is detected in a process of the sweeping robot retreating along the historical travelling trajectory, the sweeping robot is triggered to switch to the outer boundary exploration mode from the inner boundary exploration mode. However, as shown in the figure, the location of the front end of the sweeping robot is not suitable for the sweeping robot to continue the contour exploration for the preset substance in the second predetermined direction in the outer boundary exploration mode, so the sweeping robot need to move or rotate to adjust its location or orientation. After the location or orientation of the sweeping robot is adjusted to be adapted to the contour exploration in the second predetermined direction in the outer boundary exploration mode, such as the scene as shown in FIG. 7(d), the sweeping robot continues to explore the contour of the preset substance 1 to obtain more substance boundary points.

In another embodiment, after the obstacle is detected in the inner boundary exploration mode, the sweeping robot is controlled to retreat along the historical travelling trajectory until the substance boundary point is detected. Then, the sweeping robot is triggered to switch to the outer boundary exploration mode from the inner boundary exploration mode, and the sweeping robot may perform the outer boundary exploration directly in the second predetermined direction without adjusting the direction.

It should be noted that, in this embodiment, only the scene in which the obstacle is detected by the cleaning device in the inner boundary exploration mode with the clockwise direction as the first predetermined direction is illustrated as an example. It can be understood that, after an obstacle is detected in the outer boundary exploration mode, the cleaning device will be controlled to perform the second scheduled action until a substance boundary point is detected, then the cleaning device is triggered to switch to the inner boundary exploration mode. These are similar to those as shown in FIG. 7(a) to FIG. 7(d), which are not detailed herein.

In an embodiment, before or after an obstacle is detected by the cleaning device in the process of exploring the contour of the preset substance, the cleaning device detects the preset substance boundary points as follows:

the cleaning device detects the substance boundary points in the continuous inner boundary exploration mode, which may, refer to the foregoing step 1 to step 3; and the cleaning device detects the substance boundary points in the continuous outer boundary exploration mode, which may, refer to the foregoing step 4 to step 6.

The cleaning device is triggered to switch to the outer boundary exploration mode if at least one substance boundary point is detected in the inner boundary exploration mode, and the cleaning device is triggered to switch to the inner boundary exploration mode to detect the substance boundary point if at least one substance boundary point is detected in the outer boundary exploration mode, which may, refer to the embodiments as shown in FIG. 6(a) to FIG. 6(b).

It can be understood that, in this embodiment, the exploration mode before or after detecting an obstacle may be determined depending on different situations, which is not limited herein.

In the embodiments, when the substance boundary point is detected in a process of the cleaning device performing the scheduled action after detecting the obstacle, the cleaning device switches between the inner boundary exploration mode and the outer boundary exploration mode so as to efficiently avoid the obstacle. As such, the exploration of the cleaning device can be prevented from being interrupted due to the blocking of the obstacle, thereby greatly improving the stability and efficiency of the cleaning device exploring the contour of the preset substance.

In an embodiment, in the outer boundary exploration mode, the cleaning device may further perform step 7 and step 8 in the exploration process of the cleaning device:

Step 7, a first angle variation of the orientation of the cleaning device is monitored.

Step 8, if the cleaning device fails to detect the substance boundary point and the first angle variation exceeds a first angle threshold, the cleaning device is controlled to rotate in place in the second predetermined direction until the substance boundary point is detected.

Further, in this embodiment, the cleaning device may further perform step 9 and step 10 in the exploration process:

Step 9, a second angle variation of the orientation of the cleaning device is recorded in the process of the cleaning device rotating in place in the second predetermined direction.

Step 10, if the second angle variation when the substance boundary point is detected exceeds a second angle threshold, the cleaning device is controlled to rotate in place in the first predetermined direction until a new substance boundary point is detected, and the newly detected substance boundary point is recorded to the substance boundary point collection; or, when the substance boundary point is detected in a process of the cleaning device rotating in place in the second predetermined direction, a currently detected substance boundary point is recorded to the substance boundary point collection, and the cleaning device is controlled to rotate in place in the first predetermined direction until a new substance boundary point is detected, so as to adjust the exploration direction of the cleaning device to switch to the inner boundary exploration mode.

It should be noted that, in other embodiments, similarly, in the inner boundary exploration mode, a third angle variation of the orientation of the cleaning device is recorded in the detection process; and if the cleaning device fails to detect the substance boundary point and the third angle variation exceeds a third angle threshold, the cleaning device is controlled to rotate in place in the first predetermined direction until the substance boundary point is detected.

Further, in the embodiments, the method further includes: recording a fourth angle variation of the orientation of the cleaning device in the process of the cleaning device rotating in place in the first predetermined direction; controlling, if the fourth angle variation when the substance boundary point is detected exceeds a fourth angle threshold, the cleaning device to rotate in place in the second predetermined direction until a new substance boundary point is detected, and recording the newly detected substance boundary point to the substance boundary point collection; or, recording, when the substance boundary point is detected by the cleaning device in rotating in place in the first predetermined direction, a currently detected substance boundary point to the substance boundary point collection, and controlling the cleaning device to rotate in place in the second predetermined direction until a new substance boundary point is detected, so as to adjust the exploration direction of the cleaning device to switch to the outer boundary exploration mode.

In an embodiment, the recording the first angle variation of the orientation of the cleaning device in the detection process is described with reference to FIG. 8.

Figure 8:
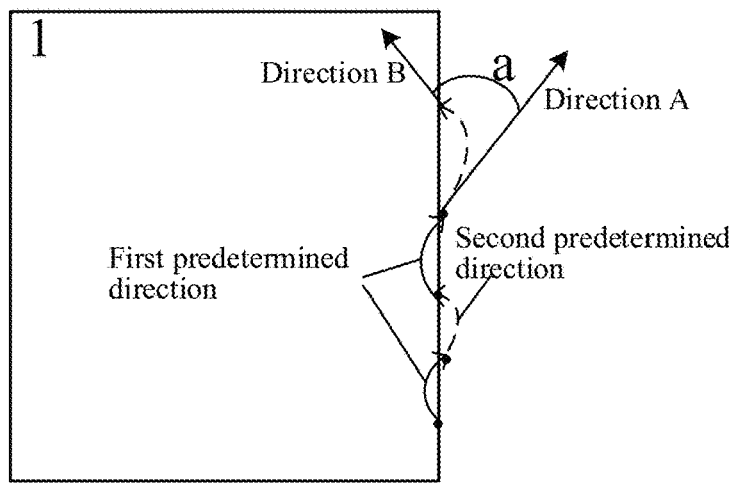
FIG. 8 shows a schematic diagram of a scene of a first angle variation for recording an orientation of a cleaning device according to an embodiment of the present disclosure.

Referring to FIG. 8, it shows a schematic diagram of a scene of a first angle variation for recording an orientation of a cleaning device according to an embodiment of the present disclosure.

In FIG. 8, the cleaning device exploring the substance boundary points in the second predetermined direction (namely, in this embodiment, the counterclockwise direction) in the outer boundary exploration mode is illustrated as an example. In this embodiment, the orientation of the front end of the cleaning device when the cleaning device starts to enter the outer boundary exploration mode is recorded as the direction A, and the orientation of the front end of the cleaning device when the next substance boundary point is detected in the second predetermined direction is recorded as the direction B. The angle "a" between the direction A and the direction B is recorded as the first angle variation. Similarly, if the cleaning device is in the inner boundary exploration mode, the third angle variation of the orientation of the cleaning device may be recorded in the same manner.

In this embodiment, the first angle threshold, the second angle threshold, the third angle threshold, and the fourth angle threshold may be set to 60°, 90°, or another angle, which is not limited herein.

Figures 9A, 9B, 9C:
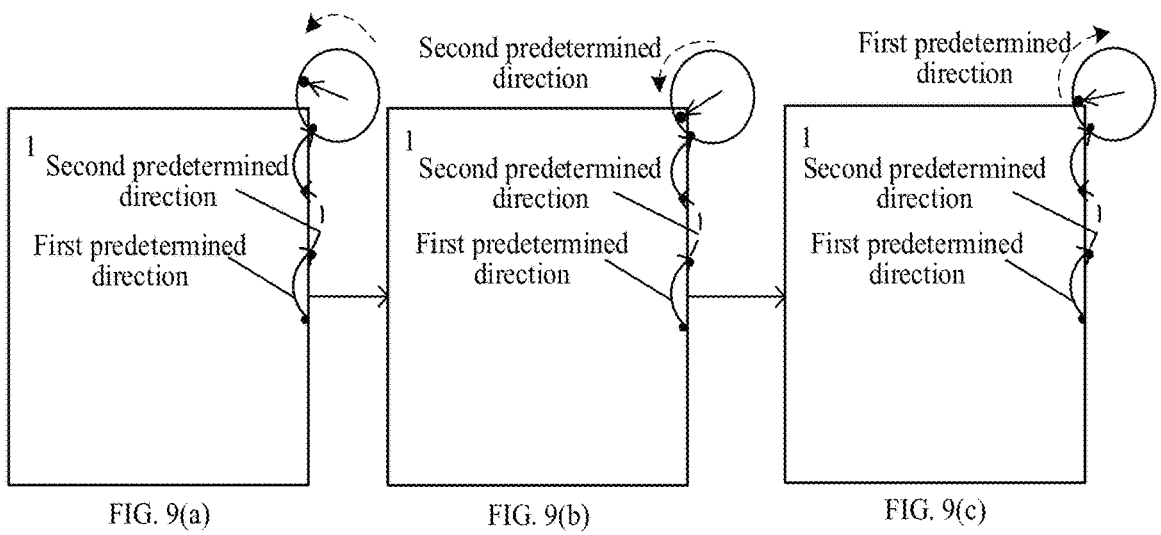
FIG. 9(a)-FIG. 9(c) show schematic diagrams of scenes of controlling a cleaning device to rotate in place in a first predetermined direction until a new substance boundary point is detected according to an embodiment of the present disclosure.

In this embodiment, the second angle variation of the orientation of the cleaning device is recorded in the process of the cleaning device rotating in place in the second predetermined direction; and if the second angle variation of the orientation of the cleaning device when the substance boundary point is detected exceeds the second angle threshold, the cleaning device is controlled to rotate in place in the first predetermined direction until the new substance boundary point is detected, and the newly detected substance boundary point is recorded to the substance boundary point collection, the specific implementation of which may be described with reference to FIG. 9(a) to FIG. 9(c).

Referring to FIG. 9(a) to FIG. 9(c), they show schematic diagrams of scenes of controlling a cleaning device to rotate in place in a first predetermined direction until a new substance boundary point is detected according to an embodiment of the present disclosure.

In FIG. 9(a) to FIG. 9(c), an example in which the cleaning device alternately switches between the inner boundary exploration mode and the outer boundary exploration mode to explore the contour of the rectangular preset substance 1 is illustrated, where the clockwise direction is marked as the first predetermined direction, and the counterclockwise direction is marked as the second predetermined direction. FIG. 9(a) corresponds to the scene in which, in the outer boundary exploration mode, the sweeping robot fails to detect the substance boundary point at the corner of the preset substance 1, and the first angle variation exceeds the first angle threshold. FIG. 9(b) corresponds to the scene in which the sweeping robot is controlled to rotate in place in the second predetermined direction and detects a substance boundary point. FIG. 9(c) corresponds to the scene in which, when the second angle variation exceeds the second angle threshold, the cleaning device is controlled to rotate in place in the first predetermined direction and detects a new substance boundary point.

In this embodiment, it should be noted that, if the second angle variation of the orientation of the cleaning device when the substance boundary point is detected does not exceed the second angle threshold, the cleaning device is controlled to switch to the inner boundary exploration mode to detect a new substance boundary point, and the newly detected substance boundary point is recorded to the substance boundary point collection.

In this embodiment, it can be understood that, in the scene as shown in FIG. 9(c), the sweeping robot has re-detected the non-preset substance signal, but the front end of the sweeping robot faces the direction of the inner side of the preset substance 1 and is not suitable for executing the outer boundary exploration mode, so the exploration direction of the sweeping robot needs to be adjusted. After the cleaning device moves or rotates to adjust the orientation of its front end so as to adapt to the contour exploration of the preset substance 1 in the second predetermined direction in the inner boundary exploration mode, the cleaning device detects the next substance boundary point in the second predetermined direction in the outer boundary exploration mode. In other embodiments, when the sweeping robot has re-detected the non-preset substance signal, but the front end of the sweeping robot faces the direction of the inner side of the preset substance 1, the sweeping robot may be directly controlled to enter the inner boundary exploration mode, and the sweeping robot is controlled to detect the next substance boundary point in the inner boundary exploration mode in the first predetermined direction.

In the embodiments, in the process of the cleaning device exploring the contour of the preset substance, by recording the angle variation of the orientation of the cleaning device in real time, the travelling trajectory of the cleaning device can be controlled not to deviate too far from the edge of the preset substance when an obstacle is detected, or during a process of exploring an irregular preset substance, or during a process of exploring a corner of a rectangular preset substance. For example, in case the travelling trajectory of the cleaning device is arc and the angle variation of the orientation of the cleaning device is not recorded, the cleaning device may detect the substance boundary point at a corner of a rectangular carpet along an arc trajectory with a larger radium. Therefore, by recording the angle variation of the orientation of the cleaning device and adjusting the exploration trajectory of the cleaning device in time, the spacing between the explored adjacent substance boundary points can be adjusted, such that an appropriate spacing is maintained between adjacent substance boundary points, which improves the accuracy of the cleaning device exploring the contour of the preset substance.

In the present disclosure, controlling the cleaning device to detect the substance boundary point along predetermined direction may further be carried out as follows:

controlling the cleaning device to detect the substance boundary point along the predetermined direction until a detection of the cleaning device is interrupted, or until a distance between a substance boundary point currently detected by the cleaning device and a first detected substance boundary point is less than a preset distance threshold, then stopping the detection of the substance boundary point.

In this embodiment, it can be understood that the contour exploration of the preset substance may be interrupted due to a detection of an obstacle, an insufficient power of the cleaning device, human factors, or the like, and in response to the interruption of the contour exploration, the detection of the substance boundary point will be stopped. If the contour exploration for the preset substance is not interrupted, when the distance between the substance boundary point currently detected by the cleaning device and the first detected substance boundary point is less than the preset distance threshold, it indicates that the cleaning device has returned to the position where the first substance boundary point was detected, and the exploration path of the cleaning device forms a closed loop, that is, the cleaning device has completed the contour exploration for the preset substance.

It should be noted that, in the present disclosure, the sweeping robot arriving at the first substance boundary point again is not limited to that the cleaning device must return to the exact position of the first substance boundary point. When the distance between the cleaning device and the first substance boundary point is less than a preset distance threshold, the sweeping robot may be determined to have arrived at the first substance boundary point again.

Continuing to refer to step 230 in FIG. 2, a contour of the preset substance is determined based on the substance boundary point collection.

In the present disclosure, the substance boundary point may include the preset substance boundary point and the non-preset substance boundary point. The preset substance boundary point is the substance boundary point determined when the non-preset substance signal is detected by the cleaning device in the inner boundary exploration mode. The non-preset substance boundary point is the substance boundary point determined when the preset substance signal is detected by the cleaning device in the outer boundary exploration mode.

Therefore, in the inner boundary exploration mode and the outer boundary exploration mode, the substance boundary point collection can be obtained by controlling the cleaning device to detect the substance boundary points in the predetermined direction.

Further, in an embodiment of step 230 as shown in FIG. 2, the determining the contour of the preset substance based on the substance boundary point collection may be carried out in any of the following three ways.

In the first way, the contour of the preset substance is determined based on the preset substance boundary points in the substance boundary point collection.

In the second way, the contour of the preset substance is determined based on the non-preset substance boundary points in the substance boundary point collection.

In the third way, the contour of the preset substance is determined based on the preset substance boundary points and the non-preset substance boundary points in the substance boundary point collection.

In an embodiment of the present disclosure, the determining the contour of the preset substance based on the substance boundary point collection may be realized in any of the following four ways:

In the first way, each substance boundary point is connected in turn in a sequence that each the substance boundary point in the substance boundary point collection is detected, to determine the contour of the preset substance.

In particular, in order to provide a better understanding for those skilled in the art, an embodiment is described below with reference to FIG. 10.

Figure 10:
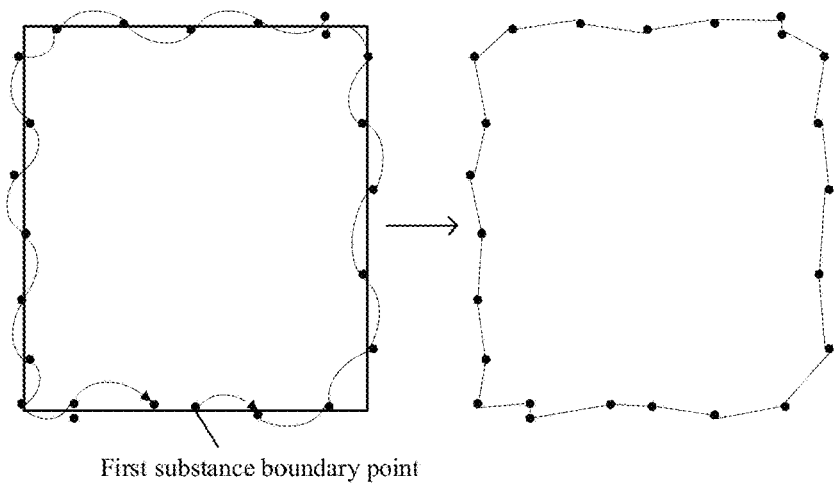
FIG. 10 shows a schematic diagram of connecting each substance boundary point in a sequence that the substance boundary points in a substance boundary point collection are detected to determine a contour of a preset substance according to an embodiment of the present disclosure.

Referring to FIG. 10, it shows a schematic diagram of connecting each substance boundary point in turn in a sequence that each the substance boundary point in a substance boundary point collection is detected to determine a contour of a preset substance.

As shown in FIG. 10, the substance boundary point collection is obtained after the cleaning device explores the contour of the preset substance 1 by alternately switching between the inner boundary exploration mode and the outer boundary exploration mode, and each substance boundary point is connected in sequence to obtain the contour of the preset substance.

In the second way, convex hull data is generated based on each substance boundary point in the substance boundary point collection, and the contour of the preset substance is determined based on the convex hull data. In particular, in order to provide a better understanding for those skilled in the art, an embodiment is described below with reference to FIG. 11.

Figure 11:
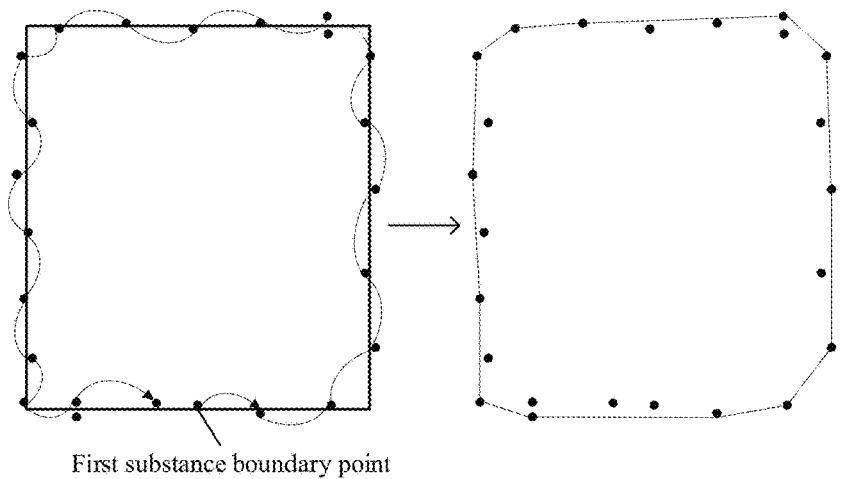
FIG. 11 shows a schematic diagram of generating convex hull data based on each substance boundary point in a substance boundary point collection to determine a contour of a preset substance based on the convex hull data according to an embodiment of the present disclosure.

Referring to FIG. 11, it shows a schematic diagram of generating convex hull data based on each substance boundary point in a substance boundary point collection to determine a contour of a preset substance based on the convex hull data.

It can be understood that, in the process of the cleaning device exploring the contour of the preset substance, some substance boundary points may be inaccurate due to a certain lag of the detection result of the sensor for obstacle detection. Therefore, contour processing the substance boundary points in the substance boundary point collection using the convex hull data processing method can improve the precision of the contour of the preset substance.

In the third way, fitting processing is performed on each substance boundary point in the substance boundary point collection to determine the contour of the preset substance. In particular, in order to provide a better understanding for those skilled in the art, an embodiment is described below with reference to FIG. 12.

Referring to FIG. 12, it shows a schematic diagram of performing fitting processing on each substance boundary point in a substance boundary point collection to determine a contour of a preset substance.

The substance boundary point collection is obtained after the cleaning device explores the contour of the preset substance 1 by alternately switching between the inner boundary exploration mode and the outer boundary exploration mode, and the fitting processing is performed on each substance boundary point to obtain a relative smooth contour of the preset substance.

In the fourth way, graph matching processing is performed on each substance boundary point in the substance boundary point collection to determine the contour of the preset substance, which is described below with reference to FIG. 13.

Referring to FIG. 13, it shows a schematic diagram of performing graph matching processing on each substance boundary point in a substance boundary point collection to determine a contour of a preset substance.

It can be understood that the preset substance is generally of a regular shape. In some embodiments, after connecting the substance boundary points or performing the convex hull processing on the substance boundary points, a first graphic is obtained, and the contour of the preset substance may be determined by calculating a matching degree between a minimum polygon which encloses the first graphic and the first graphic. For example, if the cleaning device calculates that the matching degree between the minimum rectangle which encloses the first graphic and the first graphic is 98%, and calculates that the matching degree between the minimum trapezoid which encloses the first graphic and the first graphic is 60%, the contour of the preset substance is determined to be the minimum rectangle.

Illustratively, when the cleaning device completes exploring the contour of the preset substance 1, the contour of the preset substance may be obtained by using any of the foregoing three ways, and the contour of the preset substance 1, namely the rectangular contour, can be obtained by using the graph matching method.

In this embodiment, after the cleaning device explores the contour of the preset substance, the obtained exploration record of the substance contour includes the substance boundary point collection including the preset substance boundary points and the non-preset substance boundary points. A matching contour processing method for the preset substance may be determined based on the coordinate information of each substance boundary point, which is not limited herein.

In an embodiment of the present disclosure, the method may further include the steps as shown in FIG. 14.

Referring to FIG. 14, it shows a flowchart of a method for exploring a substance contour on ground according to an embodiment of the present disclosure. The method includes step 1101 to step 1102.

Step 1101, if an exploration of the preset substance by the cleaning device is interrupted, the contour of the preset substance may be determined based on a substance boundary point collection that has been detected.

Step 1102, the unexplored preset substance is explored based on the contour of the preset substance that has been explored.

It can be understood that, if the contour exploration of the preset substance by the cleaning device is interrupted, the contour exploration of the preset substance is incomplete, and the obtained contour of the preset substance is only a contour of a partial region of the preset substance. When the cleaning device explores the preset substance again during moving, in case the cleaning device detects the substance boundary point that is located in a region corresponding to the contour of the preset substance that has been explored, it indicates that the cleaning device has detected again the region of the preset substance that has been explored and whose contour has been determined. In this case, the cleaning device will not re-explore the contour of the preset substance that has been explored.

Further, in an embodiment, exploring the unexplored preset substance based on the contour of the preset substance that has been explored may be carried out based on step 12 to step 13.

Step 12, a first substance boundary point that is first detected and a second substance boundary point that is last detected on the explored contour of the preset substance are determined, and a line between the first substance boundary point and the second substance boundary point is defined as an inner edge line of the unexplored preset substance.

Step 13, a contour of the explored region of the preset substance is determined based on the explored substance boundary points and the inner edge line, and a contour of the unexplored region of the preset substance is explored based on the contour of the explored region of the preset substance.

It can be understood that, to complete the exploring of the whole contour of the preset substance, the contour exploration may be done once, twice, or multiple times. If the distance between a first substance boundary point and a second substance boundary point in a contour exploration for the preset substance is less than the preset distance threshold, it can be considered that the contour exploration for the preset substance is complete. If the distance between the first substance boundary point and the second substance boundary point in the contour exploration for the preset substance is greater than the preset distance threshold, it needs to define the line between the first substance boundary point and the second substance boundary point as the inner edge line of the unexplored preset substance. The contour of the region of the preset substance that has been explored is determined based on the detected substance boundary points and the inner edge line, and the contour of the unexplored region of the preset substance will be explored based on the contour of the region of the preset substance that has been explored.

It should be noted that, in the scene in which the contour exploration of the preset substance by the cleaning device is incomplete, the cleaning device may explore the contour of the preset substance again. The information about the contour of the preset substance that has been explored may be obtained, and the coordinate information of the first substance boundary point and the coordinate information of the second substance boundary point on the inner edge line of the unexplored preset substance may also be obtained. Based on the coordinate information of the first substance boundary point and the coordinate information of the second substance boundary point, the cleaning device may explore the contour of the unexplored region of the preset substance again starting from the position of the first substance boundary point or its vicinity, or starting from the position of the second substance boundary point or its vicinity. It can be understood that, the cleaning device may explore the contour of the unexplored region of the preset substance again starting from any point on the contour of the explored region of the preset substance. The starting point for exploring the contour of the unexplored region of the preset substance is not limited herein.

In this embodiment, the method of, the cleaning device determining the contour of the explored region of the preset substance based on the detected substance boundary points and the inner edge line, and exploring the unexplored preset substance based on the contour of the explored region of the preset substance, may be that the cleaning device starts from the position of the first substance boundary point or its vicinity, or the position of the second substance boundary point or its vicinity, then passes through the inner edge line to explore the unexplored preset substance, in which when the distance between a detected substance boundary point and the coordinate at the starting position is less than the preset distance threshold, the exploration of the unexplored region of the preset substance is completed. Or, the method may also be that the cleaning device starts from an end of the inner edge line or a position near the inner edge line to explore the unexplored region of the preset substance without passing through the inner edge line, in which when a distance between a detected substance boundary point and the other end of the inner edge line is less than the preset distance threshold, the exploration of the contour of the unexplored region of the preset substance is completed.

It should be noted that, the foregoing embodiments specifically describe the details of exploring the unexplored preset substance based on the explored preset substance contour. Certainly, in some other embodiments, for example, the cleaning device may achieve the exploring of the unexplored preset substance contour based on a coordinate of a historically explored region recorded in the cleaning device by way of controlling the cleaning device to avoid the coordinate of the historically explored region in a new exploration process.

It should be understood that, various exploring ways may be designed for the unexplored preset substance according to actual situations, which is not limited herein.

In an embodiment of the present disclosure, if the cleaning device has explored the preset substance multiple times, the method may further include the following step 14 to step 15.

Step 14, contours of the preset substance determined by the cleaning device in the exploration are obtained.

Step 15, if there is a common contour line between any two contours of the preset substance, the any two contours of the preset substance are spliced to obtain a spliced contour of the preset substance.

It should be noted that, the common contour line may be the situation in which there is a complete overlap between the any two contours of the preset substance, or there is a fitted overlap between the any two contours of the preset substance, or there is a distance between the contour lines of the any two contours of the preset substance that is less than a preset distance threshold, which is not limited herein.

In particular, in order to provide those skilled in the art a better understanding of the embodiment, the embodiment is described below with reference to FIG. 15(*a*) to FIG. 15(*c*).

Figures 15A, 15B, 15C:
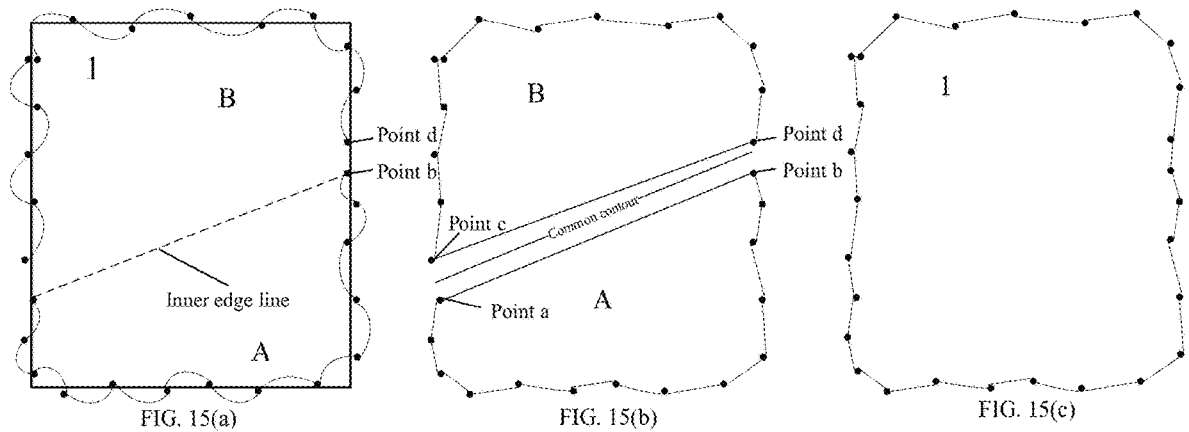
FIG. 15(a)-FIG. 15(c) show schematic diagrams of splicing, if there is a common contour line between any two contours of the preset substance, the any two contours of the preset substance to obtain a spliced contour of the preset substance according to an embodiment of the present disclosure.

Referring to FIG. 15(*a*) to FIG. 15(*c*), they show schematic diagrams of splicing, if there is a common contour line between any two contours of the preset substance, the any two contours of the preset substance to obtain a spliced contour of the preset substance according to an embodiment of the present disclosure.

As shown in FIG. 15(*a*), the area A of the preset substance is the area where the cleaning device first explores the preset substance 1, and the area B of the preset substance is the area where the cleaning device secondly explores the preset substance 1. The point a is the first substance boundary point detected in the area A of the preset substance, the point b is the second substance boundary point detected in the area A of the preset substance, the point c is the first substance boundary point detected in the area B of the preset substance, and the point d is the second substance boundary point detected in the area B of the preset substance. It is understood that, after the first exploration of the preset substance, the line between the point a and the point b may be defined as the inner edge line to explore the area B of the preset substance that is not explored.

FIG. 15(*b*) corresponds to the scene in which the cleaning device first explores the preset substance 1 to obtain a substance boundary point collection of the area A of the preset substance, and to obtain the contour of the area A of the preset substance by connecting the substance boundary points in turn in the sequence that the substance boundary points in the substance boundary point collection are detected; the cleaning device secondly explores the preset substance 1 to obtain a substance boundary point collection of the area B of the preset substance, and to obtain the contour of the area B of the preset substance by connecting the substance boundary points in turn in the sequence that the substance boundary points in the substance boundary point collection are detected. It can be understood that, because the distance between the line of the point a and the point b on the contour of the area A of the preset substance is less than the preset distance threshold, and the line of the point c and the point d on the contour of the area B of the preset substance is less than the preset distance threshold, it is considered that there is a common contour line between the contour of the area A of the preset substance and the contour of the area B of the preset substance. The contour of the area A of the preset substance is spliced with the contour of the area B of the preset substance to obtain the spliced contour of the preset substance 1.

It should be noted that obtaining the contour of the preset substance determined by the cleaning device in the exploration process may also be done by splicing the determined contours of the preset substance according to the coordinate positions of the first substance boundary point and the second substance boundary point recorded in each contour exploration of the preset substance. Or different splicing ways may be designed according to actual needs, as long as the determined contours of the preset substance can be spliced, which is not limited herein.

In this embodiment, by splicing the plurality of contours of the preset substance to obtain the spliced contour of the preset substance, the cleaning device can be made, in case that a single contour exploration is incomplete, to explore the preset substance multiple times and splice the multiple contours of the preset substance, thereby ensuring the integrity of the contour of the substance.

According to the technical solution provided by the embodiments of the present disclosure, the cleaning device alternately switches between the inner boundary exploration mode and the outer boundary exploration mode in the process of exploring the contour of the preset substance. In the inner boundary exploration mode and the outer boundary exploration mode, the cleaning device is controlled to detect the substance boundary points in the predetermined direction. After obtaining the substance boundary point collection, the data processing is performed on the substance boundary points in the substance boundary point collection to obtain the contour of the preset substance. By the technical solution of the present disclosure, the cleaning device can be controlled to explore the contour of the preset substance during moving. Based on this, movements of rotating in place of the cleaning device is reduced, which, on one hand, reduces the power consumption of the cleaning device in exploration, and on the other hand, saves the exploration time and thereby improving the efficiency of exploring the contour of the substance on ground.

The apparatus configured for performing the method for exploring the substance contour is described below. The details of the apparatus which is not disclosed may refer to the foregoing embodiments of the method for exploring the substance contour.

Figure 16:
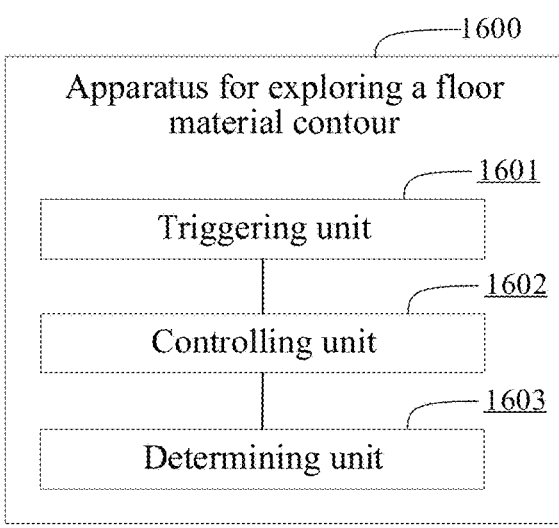
FIG. 16 shows a block diagram of an apparatus for exploring a substance contour on ground according to an embodiment of the present disclosure.

Referring to FIG. 16, it shows a block diagram of an apparatus for exploring a substance contour on ground according to an embodiment of the present disclosure. The apparatus 1600 includes a triggering unit 1601, a controlling unit 1602, and a determining unit 1603.

The triggering unit 1601 is configured to trigger, in response to a cleaning device detecting a preset substance, the cleaning device to alternately switch between an inner boundary exploration mode and an outer boundary exploration mode. The controlling unit 1602 is configured to control, in the inner boundary exploration mode and the outer boundary exploration mode, the cleaning device to detect a substance boundary point in a predetermined direction, to obtain a substance boundary point collection. The determining unit 1603 is configured to determine a contour of the preset substance based on the substance boundary point collection.

In some embodiments, based on the foregoing solution, the triggering unit 1601 is further configured to trigger the cleaning device to switch to the outer boundary exploration mode if at least one substance boundary point is detected in the inner boundary exploration mode, and trigger the cleaning device to switch to the inner boundary exploration mode if at least one substance boundary point is detected in the outer boundary exploration mode.

In some embodiments, based on the foregoing solution, the controlling unit 1602 is further configured to control, if an obstacle is detected by the cleaning device in the inner boundary exploration mode, the cleaning device to perform a first scheduled action until the substance boundary point is detected, and trigger the cleaning device to switch to the outer boundary exploration mode; and to control, if an obstacle is detected by the cleaning device in the outer boundary exploration mode, the cleaning device to perform a second scheduled action until the substance boundary point is detected, and trigger the cleaning device to switch to the inner boundary exploration mode.

In some embodiments, based on the foregoing solution, the controlling unit 1602 is further configured to control the cleaning device to rotate in place in a first predetermined direction until the substance boundary point is detected, and trigger the cleaning device to switch to the outer boundary exploration mode; or to control the cleaning device to retreat or turn around and move forward until the substance boundary point is detected, and trigger the cleaning device to switch to the outer boundary exploration mode. An exploration direction of the cleaning device in the outer boundary exploration mode is opposite to an exploration direction of the cleaning device in the inner boundary exploration mode.

In some embodiments, based on the foregoing solution, the controlling unit 1602 is further configured to control, in the inner boundary exploration mode, the cleaning device to move in a first predetermined direction to detect the substance boundary point, in which the first predetermined direction includes a clockwise direction and a counterclockwise direction; and to control, in the outer boundary exploration mode, the cleaning device to move in a second predetermined direction to detect the substance boundary point, in which the second predetermined direction is opposite to the first predetermined direction.

In some embodiments, based on the foregoing solution, the controlling unit 1602 is further configured to monitor, in the outer boundary exploration mode, a first angle variation of an orientation of the cleaning device in a detection process; and to control, if the cleaning device fails to detect the substance boundary point and the first angle variation exceeds a first angle threshold, the cleaning device to rotate in place in the second predetermined direction until the substance boundary point is detected.

In some embodiments, based on the foregoing solution, the controlling unit 1602 is further configured to record a second angle variation of the orientation of the cleaning device in a process of the cleaning device rotating in place in the second predetermined direction; to control, if the second angle variation of the orientation of the cleaning device when the substance boundary point is detected exceeds a second angle threshold, the cleaning device to rotate in place in the first predetermined direction until a new substance boundary point is detected; and to record the newly detected substance boundary point to the substance boundary point collection. Or, the controlling unit 1602 is further configured to record, when the cleaning device rotates in place in the second predetermined direction and detects the substance boundary point, the currently detected substance boundary point to the substance boundary point collection, and control the cleaning device to rotate in place in the first predetermined direction until a new substance boundary point is detected, to adjust an exploration direction of the cleaning device to switch to the inner boundary exploration mode.

In some embodiments, based on the foregoing solution, the controlling unit 1602 is further configured to monitor, in the inner boundary exploration mode, a third angle variation of an orientation of the cleaning device in a detection process; and to control, if the cleaning device fails to detect the substance boundary point and the third angle variation exceeds a third angle threshold, the cleaning device to rotate in place in the first predetermined direction until the substance boundary point is detected.

In some embodiments, based on the foregoing solution, the controlling unit 1602 is further configured to record a fourth angle variation of the orientation of the cleaning device in a process of the cleaning device rotating in place in the first predetermined direction; to control, if the fourth angle variation of the orientation of the cleaning device when the substance boundary point is detected exceeds a fourth angle threshold, the cleaning device to rotate in place in the second predetermined direction until a new substance boundary point is detected, and record the newly detected substance boundary point to the substance boundary point collection. Or, the controlling unit 1602 is further configured to record, when the cleaning device rotates in place in the first predetermined direction and detects the substance boundary point, the currently detected substance boundary point to the substance boundary point collection, and control the cleaning device to rotate in place in the second predetermined direction until a new substance boundary point is detected, to adjust an exploration direction of the cleaning device to switch to the inner boundary exploration mode.

In some embodiments, based on the foregoing solution, the controlling unit 1602 is further configured to control the cleaning device to detect the substance boundary point in the predetermined direction until the detection of the cleaning device is interrupted, or until a distance between a substance boundary point currently detected by the cleaning device and a first detected substance boundary point is less than a preset distance threshold.

In some embodiments, based on the foregoing solution, the substance boundary point includes a preset substance boundary point and a non-preset substance boundary point, the preset substance boundary point is a substance boundary point detected by the cleaning device in the inner boundary exploration mode, and the non-preset substance boundary point is a substance boundary point detected by the cleaning device in the outer boundary exploration mode.

In some embodiments, based on the foregoing solution, the controlling unit 1602 is further configured to determine the contour of the preset substance based on the preset substance boundary points in the substance boundary point collection; or determine the contour of the preset substance based on the non-preset substance boundary points in the substance boundary point collection; or determine the contour of the preset substance based on the preset substance boundary points and the non-preset substance boundary points in the substance boundary point collection.

In some embodiments, based on the foregoing solution, the determining unit 1603 is further configured to connect each substance boundary point in turn in a sequence that the substance boundary points in the substance boundary point collection are detected, to determine the contour of the preset substance; or to generate convex hull data based on each substance boundary point in the substance boundary point collection, and determine the contour of the preset substance based on the convex hull data; or to perform fitting processing on each substance boundary point in the substance boundary point collection, to determine the contour of the preset substance; or to perform graph matching processing on each substance boundary point in the substance boundary point collection, to determine the contour of the preset substance.

In some embodiments, based on the foregoing solution, the determining unit 1603 is further configured to determine, if an exploration of the preset substance by the cleaning device is interrupted, a contour of the preset substance that has been explored based on a detected substance boundary point collection; and explore a preset substance that is not explored based on the explored contour of the preset substance.

In some embodiments, based on the foregoing solution, the determining unit 1603 is further configured to determine a first substance boundary point that is first detected on the explored contour of the preset substance and a second substance boundary point that is last detected on the explored contour of the preset substance, and define a line between the first substance boundary point and the second substance boundary point as an inner edge line of the unexplored preset substance; and determine a contour of an explored region of the preset substance based on the detected substance boundary points and the inner edge line, and explore the unexplored preset substance based on the contour of the explored region of the preset substance.

In some embodiments, based on the foregoing solution, the determining unit 1603 is further configured to obtain contours of the preset substance determined by the cleaning device in an exploration process; and to splice, if there is a common contour line between any two contours of the preset substance, the any two contours of the preset substance to obtain a spliced contour of the preset substance.

In some embodiments, based on the foregoing solution, a trajectory of the cleaning device for detecting the substance boundary point in the predetermined direction includes an arc trajectory.

Based on the same inventive concept, an embodiment of the present disclosure provides a computer-readable storage medium stored with computer-executable instructions. The computer-executable instructions, when being executed by a processor, implement the steps of the foregoing method.

Figure 17:
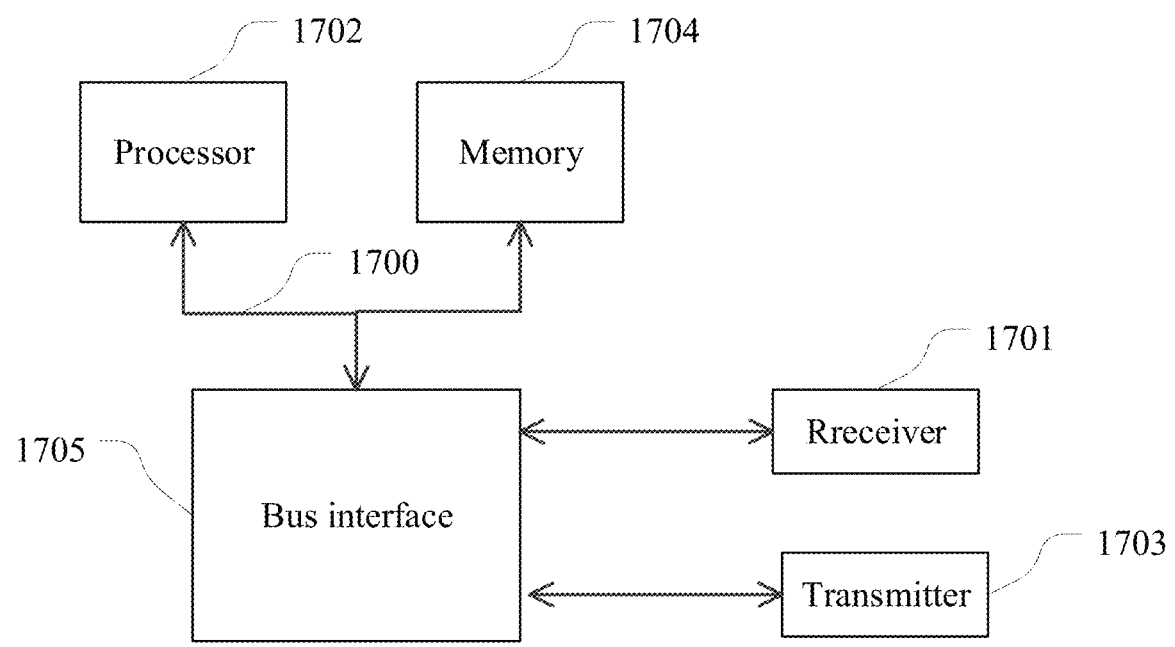
FIG. 17 shows a schematic structural diagram of a cleaning device according to an embodiment of the present disclosure.

Based on the same inventive concept, an embodiment of the present disclosure provides a cleaning device. Referring to FIG. 17, it shows a schematic structural diagram of a cleaning device according to an embodiment of the present disclosure. The cleaning device includes one or more processors 1702, one or more memories 1704, and the computer-executable instructions stored in the one or more memories 1704 and executable by the one or more processors 1702. The computer-executable instructions, when being executed by the one or more processors 1702, implement the steps of the foregoing method.

In FIG. 17, a bus architecture is represented by the bus 1700. The bus 1700 may include any number of interconnected buses and bridges. The bus 1700 links the one or more processors 1702 and the one or more memories 1704. The bus 1700 may also link other circuits, such as a peripheral device, a voltage regulator, and a power management circuit, which are known in related art and are therefore not detailed herein. The bus interface 1705 provides an interface between the bus 1700 and a receiver 1701, and provides an interface between the bus 1700 and a transmitter 1703. The receiver 1701 and the transmitter 1703 may be a same component, namely a transceiver (e.g., the ultrasonic sensor 101, the drop sensor 102, the distance sensor 106, the collision sensor 107, and the like, installed in the sweeping robot as shown in FIG. 1), configured to achieve a communication with various other apparatus over a transmission medium. The processor 1702 is configured to manage the bus 1700 and perform common processing. The memory 1704 is configured to store data used by the processor 1702 when performing operations.

The functions described herein may be implemented in hardware, software executed by a processor, a firmware, or any combination thereof. If implemented in software executed by a processor, the functions may be stored as one or more instructions in a computer-readable medium or transmitted via the computer-readable medium. Other examples and practices are within the scope and spirit of the present disclosure and the attached claims. For example, due to the nature of software, the functions described above may be implemented in software executed by a processor, a hardware, a firmware, a hardwired, or any combination thereof. In addition, the functional units may be integrated in one processing unit; or the functional units may exist separately; or two or more of the functional units may be integrated in one unit.

In the several embodiments provided in the present disclosure, it should be understood that the technical content disclosed may be implemented through other methods. The apparatus described above are illustrative. For example, the units may be divided based on the logical functions or based on other manners in practice. For example, multiple units or components may be combined or integrated into another system, or some features may be ignored or not implemented. Moreover, the coupling or direct coupling or communication connection shown or discussed herein may be indirect coupling or communication connection between the units or the components through some interfaces, and the indirect coupling or communication connection may be in electrical form, and the like.

The units described as separate components may be or may not be physically separate. The components described as control apparatuses may be or may not be physical units, that is, they may be located in one place or may be distributed over multiple units. Some or all of these units may be selected according to actual needs to achieve the technical solution of the present disclosure.

The integrated unit may be stored in a computer-readable storage medium if realized as a software functional unit and sold or used as an stand-alone product. Based on this understanding, the technical solution of the present disclosure can be essentially embodied in the form of software products, or its contribution to the related art or all or part of the technical solution can be embodied in the form of software products. The computer software product is stored in a storage medium and includes instructions for causing a computer device (such as a personal computer, a server, or a network device) to perform all or part of the steps of the method described in various embodiments of the present disclosure. The storage medium includes various mediums that can store instructions, such as a U disk, a read-only memory (ROM), a random-access memory (RAM), a mobile hard disk, a disk, and a disc.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A method for exploring a substance contour on ground, comprising:
    triggering, in response to a cleaning device detecting a preset substance on ground, the cleaning device to alternately switch between an inner boundary exploration mode and an outer boundary exploration mode;
    controlling, in the inner boundary exploration mode and the outer boundary exploration mode, the cleaning device to detect a substance boundary point in a predetermined direction, to obtain a substance boundary point collection; and
    determining a contour of the preset substance based on the substance boundary point collection;
    wherein the inner boundary exploration mode refers to that a sensor of the cleaning device for detecting an obstacle performs an edge exploration on the preset substance within the preset substance, and the outer boundary exploration mode refers to that the sensor of the cleaning device performs the edge exploration on the preset substance outside the preset substance.

2. The method according to claim 1, wherein the triggering the cleaning device to alternately switch between the inner boundary exploration mode and the outer boundary exploration mode comprises:
    triggering the cleaning device to switch to the outer boundary exploration mode if at least one substance boundary point is detected in the inner boundary exploration mode; and
    triggering the cleaning device to switch to the inner boundary exploration mode if at least one substance boundary point is detected in the outer boundary exploration mode.

3. The method according to claim 1, wherein the triggering the cleaning device to alternately switch between the inner boundary exploration mode and the outer boundary exploration mode comprises:
    controlling, if an obstacle is detected by the cleaning device in the inner boundary exploration mode, the cleaning device to perform a first scheduled action until the substance boundary point is detected, and triggering the cleaning device to switch to the outer boundary exploration mode; and
    controlling, if an obstacle is detected by the cleaning device in the outer boundary exploration mode, the cleaning device to perform a second scheduled action until the substance boundary point is detected, and triggering the cleaning device to switch to the inner boundary exploration mode.

4. The method according to claim 3, wherein the controlling the cleaning device to perform the first scheduled action until the substance boundary point is detected, and triggering the cleaning device to switch to the outer boundary exploration mode comprises:
    controlling the cleaning device to rotate in place in a first predetermined direction until the substance boundary point is detected, and triggering the cleaning device to switch to the outer boundary exploration mode; or
    controlling the cleaning device to retreat or turn around and move forward until the substance boundary point is detected, and triggering the cleaning device to switch to the outer boundary exploration mode;
    wherein an exploration direction of the cleaning device in the outer boundary exploration mode is opposite to an exploration direction of the cleaning device in the inner boundary exploration mode.

5. The method according to claim 1, wherein the controlling, in the inner boundary exploration mode and the outer boundary exploration mode, the cleaning device to detect the substance boundary point in the predetermined direction comprises:
    controlling, in the inner boundary exploration mode, the cleaning device to move in a first predetermined direction to detect the substance boundary point, the first predetermined direction comprising a clockwise direction or a counterclockwise direction; and
    controlling, in the outer boundary exploration mode, the cleaning device to move in a second predetermined direction to detect the substance boundary point, the second predetermined direction being opposite to the first predetermined direction.

6. The method according to claim 5, further comprising:
    monitoring, in the outer boundary exploration mode, a first angle variation of an orientation of the cleaning device in a detection process; and
    controlling, if the cleaning device fails to detect the substance boundary point and the first angle variation exceeds a first angle threshold, the cleaning device to rotate in place in the second predetermined direction until the substance boundary point is detected.

7. The method according to claim 6, further comprising:
    recording a second angle variation of the orientation of the cleaning device in a process of the cleaning device rotating in place in the second predetermined direction;
    controlling, if the second angle variation of the orientation of the cleaning device when the substance boundary point is detected exceeds a second angle threshold, the cleaning device to rotate in place in the first predetermined direction until a new substance boundary point is detected, and recording the newly detected substance boundary point to the substance boundary point collection; or recording, in case the substance boundary point is detected during a process of the cleaning device rotating in place in the second predetermined direction, a currently detected substance boundary point to the substance boundary point collection, and controlling the cleaning device to rotate in place in the first predetermined direction until a new substance boundary point is detected, to adjust an exploration direction of the cleaning device and switch to the inner boundary exploration mode.

8. The method according to claim 5, further comprising:
monitoring, in the inner boundary exploration mode, a third angle variation of an orientation of the cleaning device in a detection process; and
controlling, if the cleaning device fails to detect the substance boundary point and the third angle variation exceeds a third angle threshold, the cleaning device to rotate in place in the first predetermined direction until the substance boundary point is detected.

9. The method according to claim 8, further comprising:
recording a fourth angle variation of the orientation of the cleaning device in a process of the cleaning device rotating in place in the first predetermined direction;
controlling, if the fourth angle variation of the orientation of the cleaning device when the substance boundary point is detected exceeds a fourth angle threshold, the cleaning device to rotate in place in the second predetermined direction until a new substance boundary point is detected, and recording the newly detected substance boundary point to the substance boundary point collection; or
recording, in case the substance boundary point is detected in a process of the cleaning device rotating in place in the first predetermined direction, a currently detected substance boundary point to the substance boundary point collection, and controlling the cleaning device to rotate in place in the second predetermined direction until a new substance boundary point is detected, to adjust an exploration direction of the cleaning device and switch to the outer boundary exploration mode.

10. The method according to claim 1, wherein the controlling the cleaning device to detect the substance boundary point in the predetermined direction comprises:
controlling the cleaning device to detect the substance boundary point in the predetermined direction until the cleaning device interrupts exploring, or until a distance between a substance boundary point currently detected by the cleaning device and a first detected substance boundary point is less than a preset distance threshold.

11. The method according to claim 1, wherein the substance boundary point comprises a preset substance boundary point and a non-preset substance boundary point, the preset substance boundary point is a substance boundary point detected by the cleaning device in the inner boundary exploration mode, and the non-preset substance boundary point is a substance boundary point detected by the cleaning device in the outer boundary exploration mode.

12. The method according to claim 11, wherein the determining the contour of the preset substance based on the substance boundary point collection comprises:

determining the contour of the preset substance based on the preset substance boundary point in the substance boundary point collection; or
determining the contour of the preset substance based on the non-preset substance boundary point in the substance boundary point collection; or
determining the contour of the preset substance based on the preset substance boundary point and the non-preset substance boundary point in the substance boundary point collection.

13. The method according to claim 1, wherein the determining the contour of the preset substance based on the substance boundary point collection comprises:
connecting each substance boundary point in a sequence that the substance boundary points in the substance boundary point collection are detected, to determine the contour of the preset substance; or
generating convex hull data based on each substance boundary point in the substance boundary point collection, and determining the contour of the preset substance based on the convex hull data; or
performing fitting processing on each substance boundary point in the substance boundary point collection, to determine the contour of the preset substance; or
performing graph matching processing on each substance boundary point in the substance boundary point collection, to determine the contour of the preset substance.

14. The method according to claim 1, further comprising:
determining, if an exploration of the preset substance by the cleaning device is interrupted, an explored contour of the preset substance based on a detected substance boundary point collection; and
exploring an unexplored preset substance based on the explored contour of the preset substance.

15. The method according to claim 14, wherein the exploring the unexplored preset substance based on the explored contour of the preset substance comprises:
determining a first substance boundary point that is first detected on the explored contour of the preset substance and a second substance boundary point that is last detected on the explored contour of the preset substance, and defining a connection line between the first substance boundary point and the second substance boundary point as an inner edge line of the unexplored preset substance; and
determining a contour of an explored area of the preset substance based on the detected substance boundary points and the inner edge line, and exploring the unexplored preset substance based on the contour of the explored area of the preset substance.

16. The method according to claim 1, further comprising:
obtaining contours of the preset substance determined by the cleaning device in an exploration; and
splicing, if there is a common contour line between any two contours of the preset substance, the any two contours of the preset substance to obtain a spliced contour of the preset substance.

17. The method according to claim 1, wherein a detection trajectory of the cleaning device detecting the substance boundary point in the predetermined direction comprises an arc trajectory.

18. The method according to claim 1, wherein
the cleaning device is provided with an ultrasonic sensor arranged on a front side of a bottom of the cleaning device; and the controlling, in the inner boundary exploration mode and the outer boundary exploration mode, the cleaning device to detect a substance boundary point in a predetermined direction, to obtain a substance boundary point collection comprises:

controlling, in the inner boundary exploration mode and the outer boundary exploration mode, the cleaning device to move in the predetermined direction to detect the substance boundary point by the ultrasonic sensor, to obtain the substance boundary point collection.

19. A computer-readable storage medium, the computer-readable storage medium being stored with computer-executable instructions, wherein the computer-executable instructions, when being executed by a processor, implement the operations of the method as claimed in claim 1.

20. A cleaning device, comprising one or more processors and one or more memories, the one or more memories storing computer-executable instructions, wherein the computer-executable instructions, when being executed by the one or more processors, implement the operations of the method as claimed in claim 1.

\* \* \* \* \*